United States Patent
Hirano et al.

(10) Patent No.: US 6,658,190 B2
(45) Date of Patent: Dec. 2, 2003

(54) OPTICAL FIBER AND OPTICAL COMMUNICATION SYSTEM INCLUDING THE SAME

(75) Inventors: Masaaki Hirano, Yokohama (JP); Takatoshi Kato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 89 days.

(21) Appl. No.: 09/734,548

(22) Filed: Dec. 13, 2000

(65) Prior Publication Data

US 2001/0017967 A1 Aug. 30, 2001

Related U.S. Application Data

(63) Continuation-in-part of application No. PCT/JP00/02423, filed on Apr. 13, 2000.

(30) Foreign Application Priority Data

Apr. 13, 1999 (JP) .............................. 11-105452
Jun. 8, 1999 (JP) .............................. 11-160922

(51) Int. Cl.⁷ ................................. G02B 6/02
(52) U.S. Cl. ................ 385/124; 123/125; 123/126
(58) Field of Search .......................... 385/124, 123, 385/126, 127

(56) References Cited

U.S. PATENT DOCUMENTS

| | | | | |
|---|---|---|---|---|
| 4,222,631 A | * | 9/1980 | Olshansky | .................. 359/173 |
| 5,715,346 A | | 2/1998 | Liu | |
| 5,781,684 A | | 7/1998 | Liu | |
| 6,072,929 A | * | 6/2000 | Kato et al. | .................. 385/123 |
| 6,205,268 B1 | * | 3/2001 | Chraplyvy et al. | ....... 359/337.5 |
| 6,343,175 B1 | * | 1/2002 | Sasaoka | ........................ 385/123 |
| 6,349,163 B1 | * | 2/2002 | Antos et al. | ................. 385/127 |

FOREIGN PATENT DOCUMENTS

| | | |
|---|---|---|
| EP | 0 689 068 | 12/1995 |
| EP | 0 708 346 | 4/1996 |
| EP | 0 789 255 | 8/1997 |
| JP | 61-113007 | 5/1986 |
| JP | 64-9406 | 1/1989 |
| WO | WO 98/04941 | 2/1998 |
| WO | WO 00/36443 | 6/2000 |

OTHER PUBLICATIONS

Takatoshi Kato, et al., "Tei Hi Senkei, Tei Sonshitsu Jun Sekiei Core Fiber no Kaihatsu", Electronics Society Meeting in 1999, The Institute of Electronics, Information and Communication Engineers, Aug. 16, 1999, C–3–76, p. 182.

Kazuhiko Aikawa, et al., "Yuko Core Danmenseki wo kakudai shita Single Mode Hikari Fiber", Electronics Society Meeting in 1999, The Institute of Electronics, Information and Communication Engineers, Aug. 16, 1999, C–3–77, p. 183.

Kato, T: Ultra–low nonlinearity low–loss pure silica core fibre for long–haul WDM transmission; Electronics Letters, Sep. 16, 1999, vol. 35, No. 19, pp. 1615–1617.

(List continued on next page.)

*Primary Examiner*—Robert H. Kim
*Assistant Examiner*—George Y. Wang
(74) *Attorney, Agent, or Firm*—McDermott, Will & Emery

(57) ABSTRACT

The present invention relates to an optical fiber having a structure suitable for long-distance optical communications, and an optical transmission line including the same. The optical fiber in accordance with the present invention comprises a core region extending along a predetermined axis, and a cladding region disposed so as to surround the outer periphery of the core region; and, as characteristics at a wavelength of 1.55 $\mu$m, an effective area of at least 110 $\mu m^2$, a dispersion of 18 to 23 ps/nm/km, and a dispersion slope of 0.058 to 0.066 $ps/nm^2/km$.

22 Claims, 24 Drawing Sheets

OTHER PUBLICATIONS

"Long–Haul 16x10 WDM Transmission Experiment Using Higher Order Fiber Dispersion Management Technique", by Murakami et al., EECOC'98 (Sep. 20–24, 1998), pp. 313–314.

"Design and Performance of Ultra–Low–Loss Single–Mode Fiber Cable in 1.5–$\mu$m Wavelength Region", by Kitayama et al., Journal of Lightwave Technology, vol. LT–3, No. 3 (Jun. 1985), pp. 579–585.

"338 Structural Design of the Single–Mode Optical Fiber for 1.55–$\mu$m Band Submarine Optical System", by Kimura et al., Proceedings for the 1982 National Conference of Communication Engineering Branch of Institute of Electronics and Communication Engineers of Japan, pp. 2–74 (with English translation).

"Design Consideration of Single–Mode Optical Fiber Parameters", by Tateda et al., pp. 324–330 (with English translation)

"Ultra–Low–Non–Linearity Low–Loss Pure Silica Core Fiber for Long–Haul WDM Transmission", by Kato et al., Proceeedings for the 1999 Conference of Electronics Society of Institute of Electronic and Communication Engineers of Japan, p. 182 (with English translation).

"Single–Mode Optical Fiber with Large Effective Core Area", by Aikawa et al., Proceedings for the 1999 Conference of Electronics Society of Institute of Electronics and Communication Engineers of Japan, p. 183 (with English translation).

* cited by examiner

Fig.3

| | 2a (μm) | Δn+ (%) | CUTOFF WAVELENGTH λc (μm) | EFFECTIVE AREA Aeff (μm²) | DISPERSION (ps/nm/km) | DISPERSION SLOPE (ps/nm²/km) | BENDING LOSS AT 20mm DIAMETER (dB/m) | TRANSMISSION LOSS (dB/km) |
|---|---|---|---|---|---|---|---|---|
| SAMPLE 1 | 12.9 | 0.30 | 1.39 | 110 | 19.8 | 0.0610 | 3.0 | 0.169 |
| SAMPLE 2 | 13.6 | 0.30 | 1.47 | 115 | 20.3 | 0.0612 | 1.4 | 0.171 |
| SAMPLE 3 | 14.2 | 0.29 | 1.51 | 123 | 20.5 | 0.0616 | 2.8 | 0.172 |
| SAMPLE 4 | 14.8 | 0.28 | 1.50 | 130 | 20.7 | 0.0618 | 4.6 | 0.171 |
| SAMPLE 5 | 16.0 | 0.23 | 1.47 | 155 | 20.8 | 0.0622 | 6.2 | 0.172 |

Fig.8

| | 2a (μm) | 2b (μm) | Δn⁺ (%) | Δn⁻ (%) | CUTOFF WAVELENGTH λc (μm) | EFFECTIVE AREA Aeff (μm²) | DISPERSION (ps/nm/km) | DISPERSION SLOPE (ps/nm²/km) | BENDING LOSS AT 20mm DIAMETER (dB/m) | TRANSMISSION LOSS (dB/km) |
|---|---|---|---|---|---|---|---|---|---|---|
| SAMPLE 6 | 14.8 | 59.0 | +0.23 | -0.07 | 1.45 | 153 | 21.8 | 0.063 | 0.2 | 0.170 |
| SAMPLE 7 | 16.25 | 65.0 | +0.20 | -0.10 | 1.42 | 177 | 22.1 | 0.063 | 0.1 | 0.173 |
| SAMPLE 8 | 15.3 | 61.0 | +0.23 | -0.12 | 1.46 | 154 | 22.2 | 0.063 | 0.03 | 0.174 |
| SAMPLE 9 | 13.8 | 66.0 | +0.28 | -0.14 | 1.49 | 122 | 22.1 | 0.062 | 0.2 | 0.171 |
| SAMPLE 10 | 12.4 | 55.0 | +0.26 | -0.11 | 1.58 | 110 | 21.3 | 0.061 | 0.02 | 0.169 |
| SAMPLE 11 | 12.8 | 45.0 | +0.25 | -0.09 | 1.45 | 119 | 21.3 | 0.061 | 0.05 | 0.171 |
| SAMPLE 12 | 12.0 | 48.0 | +0.23 | -0.15 | 1.35 | 112 | 20.9 | 0.060 | 0.10 | 0.173 |

Fig.10

| | 2a (μm) | 2b (μm) | Δn1 (%) | Δn2 (%) | Δn3 (%) | EFFECTIVE AREA Aeff (μm²) | CUTOFF WAVELENGTH λc (μm) | DISPERSION (ps/nm/km) | DISPERSION SLOPE (ps/nm²/km) | BENDING LOSS AT 20mm DIAMETER (dB/m) | TRANSMISSION LOSS (dB/km) |
|---|---|---|---|---|---|---|---|---|---|---|---|
| SAMPLE 13 | 12.6 | 43.8 | 0.04 | -0.30 | -0.21 | 115 | 1.42 | +21.3 | +0.061 | 0.3 | 0.169 |
| SAMPLE 14 | 12.9 | 45.0 | 0.08 | -0.27 | -0.16 | 117 | 1.45 | +21.3 | +0.061 | 0.2 | 0.167 |
| SAMPLE 15 | 1.6 | 45.5 | 0.11 | -0.23 | -0.14 | 113 | 1.40 | +21.2 | +0.016 | 0.4 | 0.165 |

Fig. 13

| | α | 2a (μm) | 2b (μm) | Δna(0) (%) | Δnb (%) | DISPERSION (ps/nm/km) | DISPERSION SLOPE (ps/nm²/km) | EFFECTIVE AREA Aeff (μm²) | CUTOFF WAVELENGTH λc (μm) |
|---|---|---|---|---|---|---|---|---|---|
| SAMPLE 16 | 1.0 | 21.0 | 50.2 | 0.40 | 0.08 | 19.25 | 0.064 | 120 | 1.45 |
| SAMPLE 17 | 1.5 | 19.3 | 49.5 | 0.37 | 0.08 | 19.94 | 0.063 | 120 | 1.44 |
| SAMPLE 18 | 2.0 | 17.4 | 49.0 | 0.35 | 0.07 | 20.12 | 0.063 | 118 | 1.44 |
| SAMPLE 19 | 3.0 | 16.5 | 51.4 | 0.34 | 0.08 | 20.55 | 0.062 | 119 | 1.45 |
| SAMPLE 20 | 4.0 | 15.3 | 51.0 | 0.33 | 0.07 | 20.71 | 0.062 | 118 | 1.45 |
| SAMPLE 21 | 6.0 | 14.5 | 50.2 | 0.32 | 0.07 | 20.85 | 0.061 | 119 | 1.45 |
| SAMPLE 22 | 8.0 | 14.1 | 49.8 | 0.32 | 0.07 | 20.91 | 0.061 | 117 | 1.44 |
| SAMPLE 23 | 10.0 | 13.7 | 48.9 | 0.32 | 0.08 | 20.97 | 0.061 | 119 | 1.44 |
| SAMPLE 24 | ∞ | 12.4 | 50.1 | 0.32 | 0.08 | 21.01 | 0.061 | 117 | 1.46 |

Fig.16

| | β | 2a (μm) | 2b (μm) | Δna(a) (%) | Δnb (%) | DISPERSION (ps/nm/km) | DISPERSION SLOPE (ps/nm²/km) | EFFECTIVE AREA Aeff (μm²) | CUTOFF WAVELENGTH λc (μm) |
|---|---|---|---|---|---|---|---|---|---|
| SAMPLE 25 | 1.0 | 10.2 | 51.0 | 0.58 | 0.08 | 19.48 | 0.063 | 116 | 1.45 |
| SAMPLE 26 | 1.5 | 10.6 | 50.4 | 0.59 | 0.08 | 19.99 | 0.062 | 117 | 1.46 |
| SAMPLE 27 | 2.0 | 10.8 | 49.0 | 0.44 | 0.07 | 20.28 | 0.062 | 118 | 1.44 |
| SAMPLE 28 | 3.0 | 11.1 | 49.2 | 0.40 | 0.07 | 20.45 | 0.061 | 116 | 1.45 |
| SAMPLE 29 | 4.0 | 11.4 | 49.6 | 0.37 | 0.08 | 20.76 | 0.061 | 118 | 1.46 |
| SAMPLE 30 | 6.0 | 11.7 | 49.6 | 0.35 | 0.07 | 20.84 | 0.061 | 118 | 1.46 |
| SAMPLE 31 | 8.0 | 11.8 | 50.2 | 0.34 | 0.07 | 20.89 | 0.061 | 115 | 1.45 |
| SAMPLE 32 | 10.0 | 11.9 | 49.4 | 0.33 | 0.07 | 20.92 | 0.061 | 117 | 1.45 |
| SAMPLE 33 | 15.0 | 21.1 | 50.4 | 0.32 | 0.08 | 20.97 | 0.061 | 118 | 1.44 |
| SAMPLE 34 | ∞ | 12.4 | 50.1 | 0.32 | 0.08 | 21.01 | 0.061 | 117 | 1.46 |

Fig.22

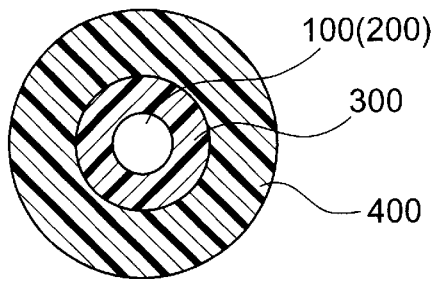

Fig.23

|  | 1ST RESIN LAYER | | 2ND RESIN LAYER | | OPTICAL FIBER | | MICROBEND LOSS (dB/km) |
|---|---|---|---|---|---|---|---|
|  | YOUNG'S MADULUS E1 (kg/mm²) | OUTSIDE DIAMETER d1 (μm) | YOUNG'S MADULUS E2 (kg/mm²) | OUTSIDE DIAMETER d2 (μm) | EFFECTIVE AREA Aeff(μm²) | CUTOFF WAVELENGTH λc(μm) | |
| SAMPLE 1 | 0.06 | 200.1 | 70 | 250.2 | 140 | 1.42 | 0.50 |
| SAMPLE 2 | 0.12 | 199.8 | 70 | 250.0 | 138 | 1.40 | 1.0 |
| SAMPLE 3 | 0.20 | 200.0 | 70 | 250.0 | 141 | 1.40 | 1.5 |

Fig.24

|  | 1ST RESIN LAYER | | 2ND RESIN LAYER | | OPTICAL FIBER | | MICROBEND LOSS (dB/km) |
|---|---|---|---|---|---|---|---|
|  | YOUNG'S MADULUS E1 (kg/mm²) | OUTSIDE DIAMETER d1 (μm) | YOUNG'S MADULUS E2 (kg/mm²) | OUTSIDE DIAMETER d2 (μm) | EFFECTIVE AREA Aeff(μm²) | CUTOFF WAVELENGTH λc(μm) | |
| SAMPLE 1 | 0.12 | 180.1 | 70 | 250.2 | 133 | 1.53 | 1.8 |
| SAMPLE 2 | 0.12 | 200.1 | 70 | 250.0 | 135 | 1.51 | 0.85 |
| SAMPLE 3 | 0.12 | 209.1 | 70 | 249.9 | 133 | 1.53 | 0.38 |

Fig.25

| | 1ST RESIN LAYER | | 2ND RESIN LAYER | | OPTICAL FIBER | | MICROBEND LOSS (dB/km) |
|---|---|---|---|---|---|---|---|
| | YOUNG'S MADULUS E1 (kg/mm²) | OUTSIDE DIAMETER d1 (μm) | YOUNG'S MADULUS E2 (kg/mm²) | OUTSIDE DIAMETER d2 (μm) | EFFECTIVE AREA Aeff(μm²) | CUTOFF WAVELENGTH λc(μm) | |
| SAMPLE 1 | 0.12 | 199.9 | 0.2 | 250.0 | 145 | 1.52 | 0.12 |
| SAMPLE 2 | 0.12 | 200.0 | 1 | 250.1 | 143 | 1.50 | 0.31 |
| SAMPLE 3 | 0.12 | 200.1 | 10 | 250.1 | 145 | 1.51 | 0.72 |
| SAMPLE 4 | 0.12 | 200.0 | 70 | 250.0 | 144 | 1.50 | 1.2 |
| SAMPLE 5 | 0.12 | 200.0 | 100 | 250.0 | 145 | 1.51 | 1.4 |

Fig.26

| | 1ST RESIN LAYER | | 2ND RESIN LAYER | | OPTICAL FIBER | | MICROBEND LOSS (dB/km) |
|---|---|---|---|---|---|---|---|
| | YOUNG'S MADULUS E1 (kg/mm²) | OUTSIDE DIAMETER d1 (μm) | YOUNG'S MADULUS E2 (kg/mm²) | OUTSIDE DIAMETER d2 (μm) | EFFECTIVE AREA Aeff(μm²) | CUTOFF WAVELENGTH λc(μm) | |
| SAMPLE 1 | 0.12 | 290.0 | 0.2 | 400.0 | 182 | 1.48 | 0.45 |
| SAMPLE 2 | 0.12 | 290.0 | 1 | 399.9 | 178 | 1.53 | 0.96 |
| SAMPLE 3 | 0.12 | 290.1 | 10 | 399.9 | 184 | 1.50 | 2.3 |
| SAMPLE 4 | 0.12 | 290.0 | 70 | 399.9 | 180 | 1.48 | 4.1 |
| SAMPLE 5 | 0.12 | 290.1 | 100 | 400.1 | 176 | 1.49 | 4.5 |

Fig.27

| | 1ST RESIN LAYER | | 2ND RESIN LAYER | | OPTICAL FIBER | | MICROBEND LOSS (dB/km) |
|---|---|---|---|---|---|---|---|
| | YOUNG'S MADULUS E1 (kg/mm²) | OUTSIDE DIAMETER d1 (μm) | YOUNG'S MADULUS E2 (kg/mm²) | OUTSIDE DIAMETER d2 (μm) | EFFECTIVE AREA Aeff(μm²) | CUTOFF WAVELENGTH λc(μm) | |
| SAMPLE 1 | 0.12 | 199.9 | 70 | 250.1 | 165 | 1.48 | 8.2 |
| SAMPLE 2 | 0.12 | 200.0 | 70 | 349.9 | 162 | 1.50 | 1.5 |
| SAMPLE 3 | 0.12 | 200.1 | 70 | 400.0 | 167 | 1.47 | 0.95 |
| SAMPLE 4 | 0.12 | 200.0 | 70 | 450.0 | 167 | 1.52 | 0.65 |

Fig.28

| | FIBER DIAMETER (μm) | EFFECTIVE AREA Aeff (μm²) | CUTOFF WAVELENGTH λc (μm) | DISPERSION VALUE (ps/nm/km) | DISPERSION SLOPE (ps/nm²/km) | MICROBEND LOSS (dB/km) |
|---|---|---|---|---|---|---|
| SAMPLE 1 | 125 | 150 | 1.35 | 21.3 | 0.060 | 1.50 |
| SAMPLE 2 | 135 | 152 | 1.34 | 20.7 | 0.060 | 0.70 |
| SAMPLE 3 | 150 | 149 | 1.33 | 21.0 | 0.060 | 0.28 |
| SAMPLE 4 | 180 | 151 | 1.34 | 20.9 | 0.060 | 0.05 |

OPTICAL FIBER AND OPTICAL COMMUNICATION SYSTEM INCLUDING THE SAME

RELATED APPLICATION

The present application is a continuation-in-part application of PCT application No. PCT/JP00/02423 filed on Apr. 13, 2000, designating U.S.A. and now pending, which in turn claims the benefit of Japanese Patent Application No. 11-105452, filed Apr. 13, 1999 and Japanese Patent Application No. 11-160922, filed Jun. 8, 1999, the disclosures of which Applications are incorporated by reference herein. The benefit of the filing and priority dates of the International and Japanese Applications is respectfully requested

BACKGROUND OF THE INVENTION

1. Field of the Invention

The present invention relates to an optical fiber applicable to an optical transmission line for optical communication systems.

2. Background of the Invention

Single-mode optical fibers have conventionally been used as optical transmission lines in optical communications. Such single-mode optical fibers have a zero-dispersion wavelength in the vicinity of a wavelength of 1.3 $\mu$m, a positive dispersion slope in the 1.55-$\mu$m wavelength band, and a dispersion of about 18 ps/nm/km at a wavelength of 1.55 $\mu$m.

Single-mode optical fibers having optical characteristics such as those mentioned above are defined in G652 and G654 standards of ITU-T, and have a simple refractive index profile composed of a core and a cladding. The 1.55-$\mu$m wavelength band (1500 nm to 1600 nm) is applied to a signal wavelength band since silica glass, which is the main ingredient of optical fibers, has a low attenuation in this wavelength band. On the other hand, as mentioned above, a single-mode optical fiber has a positive dispersion in the 1.55-$\mu$m wavelength band. Hence, in order to compensate for this positive dispersion, an example constructing an optical communication system by combining a dispersion-compensating optical fiber having a negative dispersion with a large absolute value in the 1.55-$\mu$m wavelength band and the single-mode optical fiber is reported in M. Murakami, et al., EOCC'98, pp. 313–314 (1998), for instance.

SUMMARY OF THE INVENTION

The inventors have studied conventional optical fibers and, as a result, have found a problem as follows. Namely, the single-mode optical fibers defined in the above-mentioned G652 and G654 standards have an effective area which is greater than that of dispersion-compensating optical fibers and the like, and is about 80 $\mu$m$^2$ at 1550 nm. Therefore, the single-mode optical fibers are relatively effective in reducing nonlinear optical phenomena.

Meanwhile, for elongating repeater intervals in an optical communication system, optical signals incident thereon are required to increase their power. Here, optical fibers utilized in optical transmission lines between repeaters must further increase their effective area, so as to fully restrain nonlinear optical phenomena from occurring even when optical signals having a high power propagate through the optical fibers.

However, the optical fibers defined in G652 and G654 standards cannot fully suppress the occurrence of nonlinear optical phenomena. Therefore, it has been difficult to carry out optical communications over a longer distance by utilizing the conventional optical fibers.

For overcoming the problem such as that mentioned above, it is an object of the present invention to provide an optical fiber comprising a structure suitable for long-distance optical communications, and an optical communication system including the same.

The optical fiber in accordance with the present invention is an optical waveguide which is mainly composed of silica glass and is disposed in at least one of areas between an optical transmitter for outputting an optical signal and an optical receiver for receiving the optical signal, between the optical transmitter and a repeater including an optical amplifier or the like, between repeaters, and between a repeater and the optical receiver. Applicable to this optical fiber is any of an optical fiber having a matched type refractive index profile obtained when the cladding region surrounding the outer periphery of the core region is constituted by a single layer, and an optical fiber having a depressed cladding type refractive index profile obtained when the cladding region is constituted by at least an inner cladding in contact with the core region and an outer cladding having a refractive index higher than that of the inner cladding.

This optical fiber has, as characteristics at a wavelength of 1.55 $\mu$m (1550 nm), an effective area of at least 110 $\mu$m$^2$, a dispersion of 18 to 23 ps/nm/km, and a dispersion slope of 0.058 to 0.066 ps/nm$^2$/km, whether it has the above-mentioned matched type refractive index profile or depressed cladding type refractive index profile.

In particular, it is preferred in the optical fiber having a matched type refractive index profile that the relative refractive index difference of the core region with respect to the cladding region be +0.15% to +0.30%. Obtained in this case is an optical fiber having a cutoff wavelength of 1.3 $\mu$m to 1.75 $\mu$m, and an effective area of at least 110 $\mu$m$^2$ at a wavelength of 1.55 $\mu$m.

On the other hand, the optical fiber having a depressed cladding type refractive index profile comprises a core region, an inner cladding region disposed at the outer periphery of the core region, and an outer cladding disposed so as to surround the outer periphery of the inner cladding, and has an effective area of at least 110 $\mu$m$^2$ at a wavelength of 1.55 $\mu$m. Here, the inner cladding and outer cladding constitute a cladding region surrounding the outer periphery of the core region, the inner cladding has a refractive index lower than that of the core region, and the outer cladding has a refractive index higher than that of the inner cladding.

In any of the optical fibers having the above-mentioned refractive index profiles, the effective area is preferably at least 120 $\mu$m$^2$, more preferably 150 $\mu$m$^2$, at a wavelength of 1.55 $\mu$m. Enlarging the effective area as such effectively restrains nonlinear optical phenomena from occurring even when the power of incident optical signal (1.55-$\mu$m wavelength band) is enhanced, thereby enabling optical communications over a longer distance.

Preferably, this optical fiber has a transmission loss of 0.30 dB/km or less at a wavelength of 1.38 $\mu$m (1380 nm). Further preferably, the cutoff wavelength (the cutoff wavelength of LP$_{11}$ mode measured in a state where an optical fiber having a length of 2 m is loosely wound about a mandrel having a radius of 140 mm by one turn) is 1.3 $\mu$m to 1.75 $\mu$m. In this case, a single mode is assured, in a cable having over 1 km length, in the 1.55-$\mu$m wavelength band, and also the bending loss is restrained from increasing (which is advantageous for cabling). For realizing long-distance optical communications, it is preferred that the transmission loss at a wavelength of 1.55 μm be 0.180 dB/km or less at most.

For satisfying the condition concerning cutoff wavelength mentioned above, the core region preferably has an outside diameter of 11.5 μm to 23.0 μm. If the outside diameter (fiber diameter) of the cladding region is set to 130 μm to 200 μm, then microbend loss can be reduced, and the probability of breakage can be lowered.

In the optical fiber having a depressed cladding type refractive index profile, the ratio $2b/2a$ of the outside diameter $2b$ of the inner cladding to the outside diameter $2a$ of the core region is preferably 1.1 to 7. This is because of the fact that the cutoff wavelength can be shortened without increasing the bending loss and that the effective area can be enlarged while in a state where the single mode is assured in the 1.55-μm wavelength band even if the outside diameter of the core region is enlarged. Preferably, the refractive index differences of the core region and inner cladding with respect to the outer cladding are +0.15% to +0.50% and −0.15% to −0.01%, respectively. Under such a condition, an optical fiber having a cutoff wavelength of 1.3 μm to 1.75 μm and an effective area of at least 110 μm² at a wavelength of 1.55 μm is obtained.

Preferably, in the optical fiber in accordance with the present invention, the core region is made of silica glass which is not intentionally doped with impurities (hereinafter referred to as pure silica glass), whereas the cladding region (composed of the inner and outer claddings in the case of the optical fiber having a depressed cladding type refractive index profile) is made of silica glass doped with fluorine. In such a configuration, since the core region is not intentionally doped with impurities such as Ge element, the transmission loss can be suppressed by about 0.02 dB/km as compared with optical fibers whose core region is doped with Ge. In such a configuration in which only the refractive index of the cladding region is controlled with reference to the core region, however, the amount of impurities added to the cladding region must be enhanced in order to enlarge the difference in refractive index between the core region and cladding region. If the core region is doped with chlorine which yields a smaller increase of transmission loss upon doping, as compared with Ge, Al, and P, so as to enhance the refractive index of the core region with respect to pure silica glass, then a sufficient refractive index difference can be generated between the core region and cladding region even when the amount of fluorine added to the cladding region is lowered. Namely, the amount of addition of fluorine, which causes the transmission loss to increase, can be lowered without affecting optical characteristics.

The optical fiber in accordance with the present invention, in the core region in particular, may have a refractive index profile which gradually changes from a center part of the core region toward an outer peripheral part thereof. Specifically, a radial refractive index profile form in the core region is controlled such that, in a cross section of the core region, the refractive index difference $\Delta n_a(r)$ at a location radially separated by a distance r ($0 \leq r \leq \alpha$) from the center part of the core region with respect to a reference region of the cladding region is approximated by the following expression:

$$\Delta n_a(r) = \Delta n_a(0) \cdot |1 - (r/\alpha)^\alpha| \qquad (1)$$

where $\Delta n_a(0)$ is the relative refractive index difference of the center part of the core region with respect to the reference region of the cladding region; and $\alpha$ is a real number of 1 to 10.

The refractive index profile whose part corresponding to the core region is expressed by the above-mentioned approximate expression (1) attains a dome-shaped form in which a center portion is raised from a peripheral portion in the part corresponding to the core region.

Also, the radial refractive index profile form in the core region may be controlled such that, in a cross section of the core region, the refractive index difference $\Delta n_a(r)$ at a location radially separated by a distance r ($0 \leq r \leq \alpha$) from the center part of the core region with respect to a reference region of the cladding region is approximated by the following expression:

$$\Delta n_a(r) = \Delta n_a(\alpha) \cdot |1 - \gamma \cdot (1 - r/\alpha)^\beta| \qquad (2)$$

where $\Delta n_a(a)$ is the relative refractive index difference at a location corresponding to the outer periphery of the core region with respect to the reference region of the cladding region;

$\beta$ is a real number of 1 to 10; and $\gamma$ is a positive real number.

The refractive index profile whose part corresponding to the core region is expressed by the above-mentioned approximate expression (2) attains a form in which a peripheral portion is raised from a center portion in the part corresponding to the core region. In any of the cases with the above-mentioned approximate expressions (1) and (2), the relative refractive index difference $\Delta n_a$ in the core region is set with reference to the location yielding the lowest refractive index. As a consequence, the reference region of the cladding region corresponds to the single cladding region itself in the case of the optical fiber having a matched type refractive index profile, and the inner cladding in the case of the optical fiber having a depressed cladding type refractive index profile.

The optical fibers having the above-mentioned structures are applicable to optical communication systems propagating optical signals in a wavelength band of 1.35 to 1.52 μm in addition to the 1.55-μm wavelength band of 1530 to 1565 nm and 1.58-μm wavelength band of 1570 to 1620 nm. Also, such an optical communication system may comprise an optical amplifier, disposed upstream the optical fiber, for amplifying a plurality of wavelengths of optical signals. Such an optical amplifier may include an erbium-doped fiber amplifier comprising an amplification optical fiber doped with erbium, and a Raman amplifier.

Here, as shown in Japanese Patent Application Laid-Open No. HEI 8-248251 (EP 0 724 171 A2), the above-mentioned effective area $A_{eff}$ is given by the following expression (3):

$$A_{eff} = 2\pi \left( \int_0^\infty E^2 r \, dr \right)^2 \bigg/ \left( \int_0^\infty E^4 r \, dr \right) \qquad (3)$$

where E is the electric field accompanying the propagating light, and r is the radial distance from the center of the core region. On the other hand, the dispersion slope in this specification is given by the gradient of the graph indicating the wavelength dependence of dispersion.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a table showing structural parameters and optical characteristics of a plurality of samples prepared as the optical fiber in accordance with the first embodiment shown in FIGS. 2A and 2B;

FIG. 8 is a table showing structural parameters and optical characteristics of a plurality of samples prepared as the optical fiber in accordance with the second embodiment shown in FIGS. 4A and 4B;

FIG. 10 is a table showing structural parameters and optical characteristics of a plurality of samples prepared as the optical fiber in accordance with the first applied example having the refractive index profile shown in FIG. 9;

FIG. 13 is a table showing structural parameters and optical characteristics of a plurality of samples prepared as the optical fiber in accordance with the second applied example having the refractive index profile shown in FIG. 12;

FIG. 16 is a table showing structural parameters and optical characteristics of a plurality of samples prepared as the optical fiber in accordance with the third applied example having the refractive index profile shown in FIG. 15;

FIG. 22 is a view showing a cross-sectional structure of an optical fiber coated with a resin layer;

FIG. 23 is a table showing microbend loss (dB/km) obtained when the Young's modulus (kg/mm$^2$) of a first resin is altered in three kinds of samples of the optical fiber resin-coated as shown in FIG. 22;

FIG. 24 is a table showing microbend loss (dB/km) obtained when the outside diameter ($\mu$m) of a first resin layer is altered in three kinds of samples of the optical fiber resin-coated as shown in FIG. 22;

FIG. 25 is a table showing microbend loss (dB/km) obtained when the Young's modulus (kg/mm$^2$) of a second resin is altered in five kinds of samples of the optical fiber resin-coated as shown in FIG. 22;

FIG. 26 is a table showing microbend loss (dB/km) obtained when the outside diameter ($\mu$m) of the second resin is altered in five kinds of samples of the optical fiber resin-coated as shown in FIG. 22;

FIG. 27 is a table showing microbend loss (dB/km) obtained when the outside diameter ($\mu$m) of the second resin layer is altered in four kinds of samples of the optical fiber resin-coated as shown in FIG. 22;

FIG. 28 is a table showing microbend loss (dB/km) obtained when the outside diameter ($\mu$m) of a second resin layer is altered in four kinds of samples of the optical fiber resin-coated as shown in FIG. 22.

DETAILED DESCRIPTION OF THE PREFERRED EMBODIMENT

In the following, embodiments of the optical fiber in accordance with the present invention and optical communication system including the same will be explained with reference to FIGS. 1A to 2B, 3, 4A, 4B, 5 to 17, 18A to 19D, 20, 21A, 21B, and 22 to 29. In the explanation of the drawings, constituents identical to each other will be referred to with numerals or letters identical to each other without repeating their overlapping descriptions.

Figure 1A:
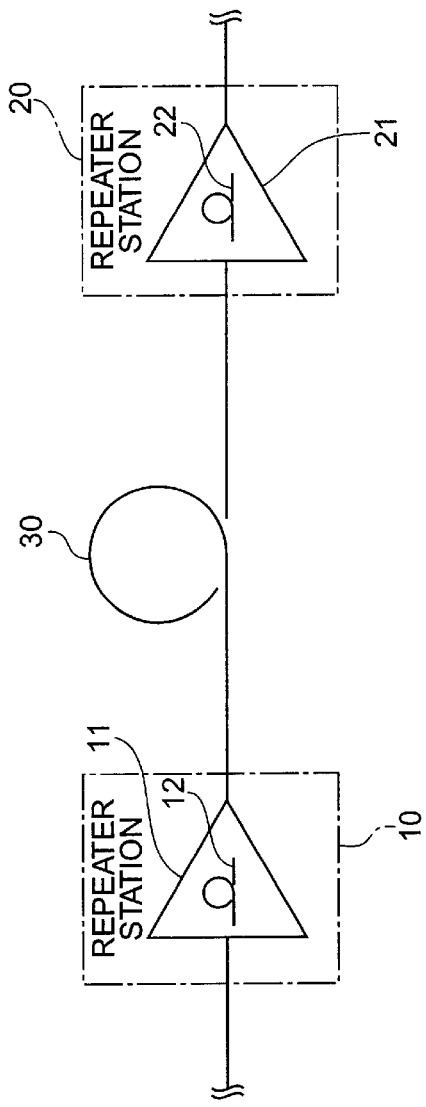
FIGS. 1A and 1B are views showing schematic configurations of the optical communication system in accordance with the present invention.
Figure 1B:
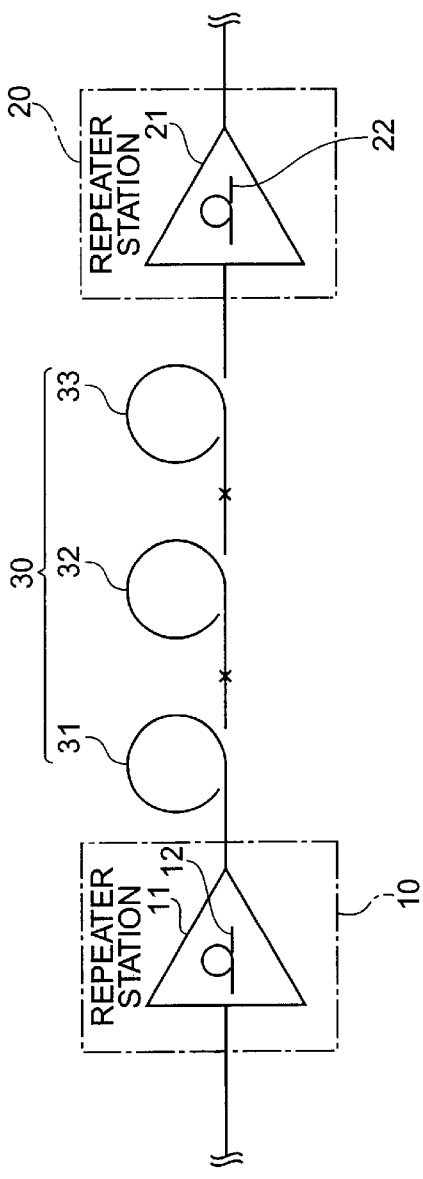

FIGS. 1A and 1B are views showing schematic configurations of the optical communication system in accordance with the present invention. As shown in FIG. 1A, the optical communication system in accordance with the present invention comprises a configuration in which an optical fiber 30 is disposed between repeaters 10, 20. Here, the repeaters 10, 20 may comprise respective optical amplifiers 11, 21 for enabling long-distance transmissions of optical signals in a wavelength band of 1350 to 1520 nm, 1520 to 1565 nm, or 1570 to 1620 nm. Such optical amplifiers 11, 21 may include erbium-doped fiber amplifiers comprising amplification optical fibers 12, 22 doped with erbium or include Raman amplifiers. At both ends of the optical fiber 30, an optical transmitter for sending out optical signals and an optical receiver for receiving the optical signals may be disposed in place of the repeaters 10, 20. Thus, in this optical communication system, the optical fiber 30 is disposed in at least one of areas between an optical transmitter and an optical receiver, between the optical transmitter and a repeater, between individual repeaters, and between a repeater and the optical receiver.

Also, the optical fiber 30 may comprise a structure in which a plurality of components 31 to 33 are fusion-spliced as shown in FIG. 1B. Such a mode includes a configuration in which a plurality of optical fibers in accordance with the present invention are prepared as the plurality of components 31 to 33, and a configuration in which the optical fibers in accordance with the present invention are combined with other optical fibers such as dispersion-compensating optical fibers and dispersion-shifted optical fibers.

Embodiments of the optical fiber in accordance with the present invention will now be explained.

First Embodiment

Figure 2A:
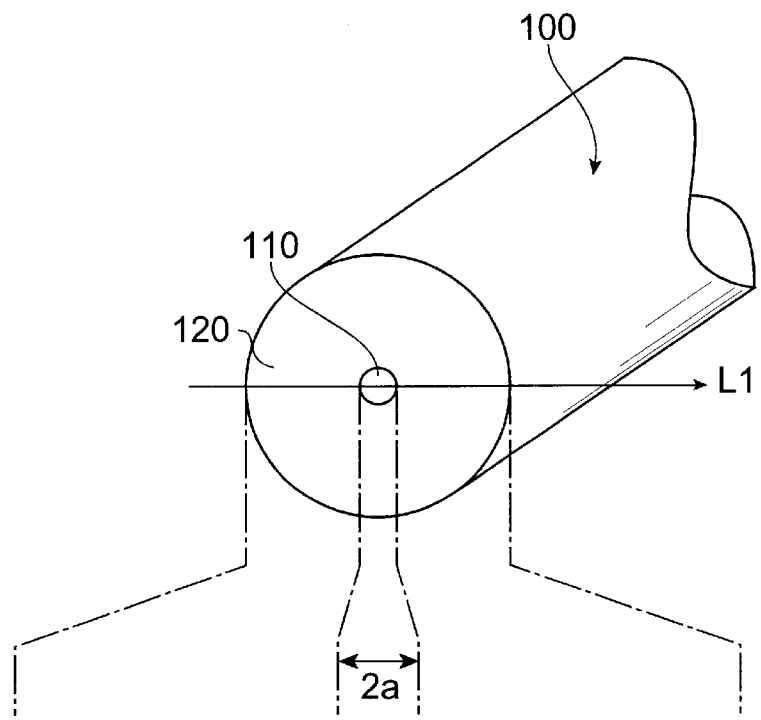
FIGS. 2A and 2B are views showing the cross-sectional structure and refractive index profile of a first embodiment of the optical fiber in accordance with the present invention, respectively.
Figure 2B:
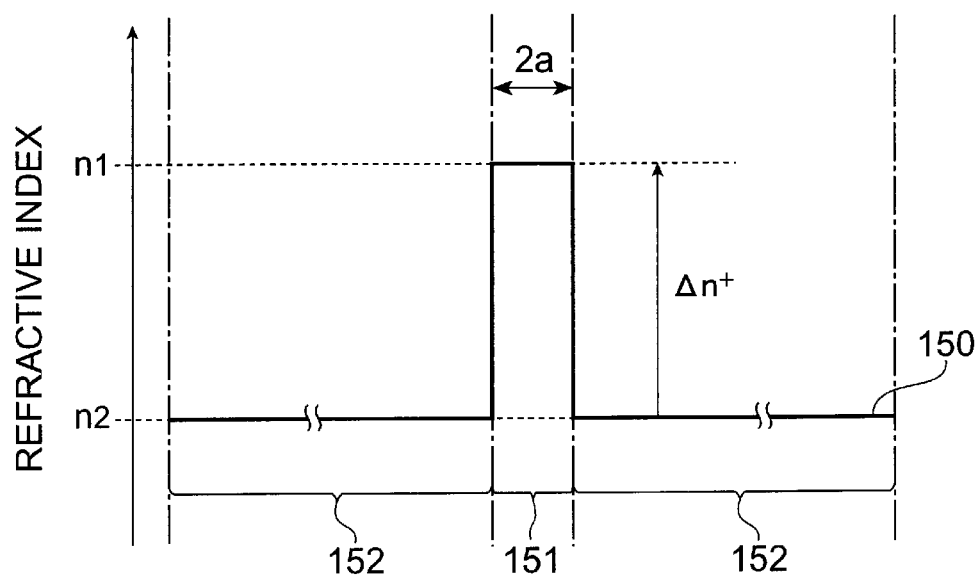

FIGS. 2A and 2B are views showing the cross-sectional structure and refractive index profile 150 of the optical fiber 100 in accordance with a first embodiment, respectively. The optical fiber 100 in accordance with the first embodiment is applicable to the above-mentioned optical communication system shown in FIGS. 1A and 1B. As shown in FIG. 2A, the optical fiber 100 in accordance with the first embodiment comprises a core region 110 extending along a predetermined axis and having a refractive index n1 and an outside diameter 2a; and a cladding region 120, disposed so as to surround the outer periphery of the core region 110, having a refractive index n2 lower than that of the core region 110.

The refractive index profile 150 shown in FIG. 2B, on the other hand, indicates the refractive index at each location on the line L1 (line orthogonal to the predetermined axis) in FIG. 2A. Specifically, regions 151 and 152 indicate the refractive indices of respective locations on the line L1 in the core region 110 and cladding region 120, respectively. In the first embodiment, the relative refractive index difference $\Delta n^+$ of the core region 110 with respect to the cladding region 120 (reference region) is defined as follows:

$$\Delta n^+ = (n1-n2)/n2$$

In this specification, the relative refractive index difference $\Delta n^+$ is represented in terms of percentage.

The optical fiber 100 in accordance with the first embodiment having the foregoing structure is characterized in that it has, as characteristics at a wavelength of 1.55 μm, an effective area of at least 110 μm², preferably 120 μm², more preferably 150μm², a dispersion of 18 to 23 ps/nm/km, and a dispersion slope of 0.058 to 0.066 ps/nm²/km. The effective area at a wavelength of 1600 nm is at least 130 μm². If the relative refractive index difference $\Delta n^+$ of the core region 110 to the cladding region 120 is set to +0.15% to +0.30%, then the optical fiber 100 in accordance with the first embodiment can have a cutoff wavelength (cutoff wavelength of $LP_{11}$ mode measured in a state where an optical fiber having a length of 2 m is loosely wound about a mandrel having a radius of 140 mm by one turn) of 1.3 μm to 1.75 μm, and an effective area $A_{eff}$ of at least 110 μm² at a wavelength of 1.55 μm. For reducing the number of repeater stations to be installed, the optical fiber 100 in accordance with the first embodiment preferably has a transmission loss of 0.30 dB/km or less at a wavelength of 1.38 μm at least.

FIG. 3 is a table showing the structural parameters and optical characteristics at a wavelength of 1.55 μm of samples 1 to 5 of the optical fiber 100 having the above-mentioned structure in accordance with the first embodiment.

As can be seen from the table of FIG. 3, the optical fiber in accordance with sample 1 is set such that the outside diameter of core region 110 is 12.9 μm, and the relative refractive index difference $\Delta n^+$ of the core region 110 with respect to the cladding region 120 is 0.30%. Such an optical fiber in accordance with sample 1 has a cutoff wavelength $\lambda_c$ of 1.39 μm. Also, at a wavelength of 1.55 μm, the optical fiber in accordance with sample 1 has an effective area $A_{eff}$ of 110 μm², a dispersion of 19.8 ps/nm/km, a dispersion slope of 0.0610 ps/nm²/km, a bending loss which becomes 3.0 dB/m at a diameter of 20 mm, and a transmission loss of 0.169 dB/km.

The optical fiber in accordance with sample 2 is set such that the outside diameter of core region 110 is 13.6 μm, and the relative refractive index difference $\Delta n^+$ of the core region 110 with respect to the cladding region 120 is 0.30%. Such an optical fiber in accordance with sample 2 has a cutoff wavelength $\lambda_c$ is 1.47 μm. Also, at a wavelength of 1.55 μm, the optical fiber in accordance with sample 2 has an effective area $A_{eff}$ of 115 μm², a dispersion of 20.3 ps/nm/km, a dispersion slope of 0.0612 ps/nm²/km, a bending loss which becomes 1.4 dB/m at a diameter of 20 mm, and a transmission loss of 0.171 dB/km.

The optical fiber in accordance with sample 3 is set such that the outside diameter of core region 110 is 14.2 μm, and the relative refractive index difference $\Delta n^+$ of the core region 110 with respect to the cladding region 120 is 0.29%. Such an optical fiber in accordance with sample 3 has a cutoff wavelength $\lambda_c$ of 1.51 μm. Also, at a wavelength of 1.55 μm, the optical fiber in accordance with sample 3 has an effective area $A_{eff}$ of 123 μm², a dispersion of 20.5 ps/nm/km, a dispersion slope of 0.0616 ps/nm²/km, a bending loss which becomes 2.8 dB/m at a diameter of 20 mm, and a transmission loss of 0.172 dB/km.

The optical fiber in accordance with sample 4 is set such that the outside diameter of core region 110 is 14.8 μum, and the relative refractive index difference $\Delta n^+$ of the core region 110 with respect to the cladding region 120 is 0.28%. Such an optical fiber in accordance with sample 4 has a cutoff wavelength $\lambda_c$ of 1.50 μm. Also, at a wavelength of 1.55 μm, the optical fiber in accordance with sample 4 has an effective area $A_{eff}$ of 130 μm², a dispersion of 20.7 ps/nm/km, a dispersion slope of 0.0618 ps/nm²/km, a bending loss which becomes 4.6 dB/m at a diameter of 20 mm, and a transmission loss of 0.171 dB/km.

The optical fiber in accordance with sample 5 is set such that the outside diameter of core region 110 is 16.0 μm, and the relative refractive index difference $\Delta n^+$ of the core region 110 with respect to the cladding region 120 is 0.23%. Such an optical fiber in accordance with sample 5 has a cutoff wavelength $\lambda_c$ of 1.47 μm. Also, at a wavelength of 1.55 μm, the optical fiber in accordance with sample 5 has an effective area $A_{eff}$ of 155 $\mu m^2$, a dispersion of 20.8 ps/nm/km, a dispersion slope of 0.0622 ps/nm²/km, a bending loss which becomes 6.2 dB/m at a diameter of 20 mm, and a transmission loss of 0.172 dB/km.

Though the optical fiber 100 in accordance with the first embodiment explained in the foregoing is an optical fiber comprising a matched type refractive index profile constituted by the single cladding region 120 alone, it may be an optical fiber having a depressed cladding type refractive index profile in which the cladding region 120 is constituted by an inner cladding and an outer cladding having a refractive index higher than that of the inner cladding.

Second Embodiment

Figure 4A:
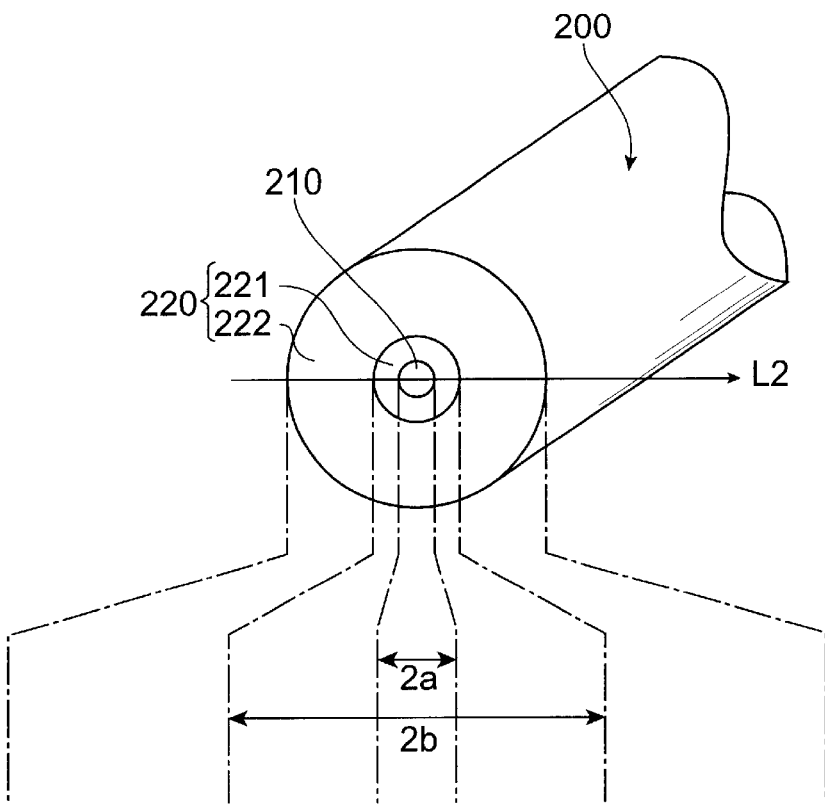
FIGS. 4A and 4B are views showing the cross-sectional structure and refractive index profile of a second embodiment of the optical fiber in accordance with the present invention, respectively.
Figure 4B:
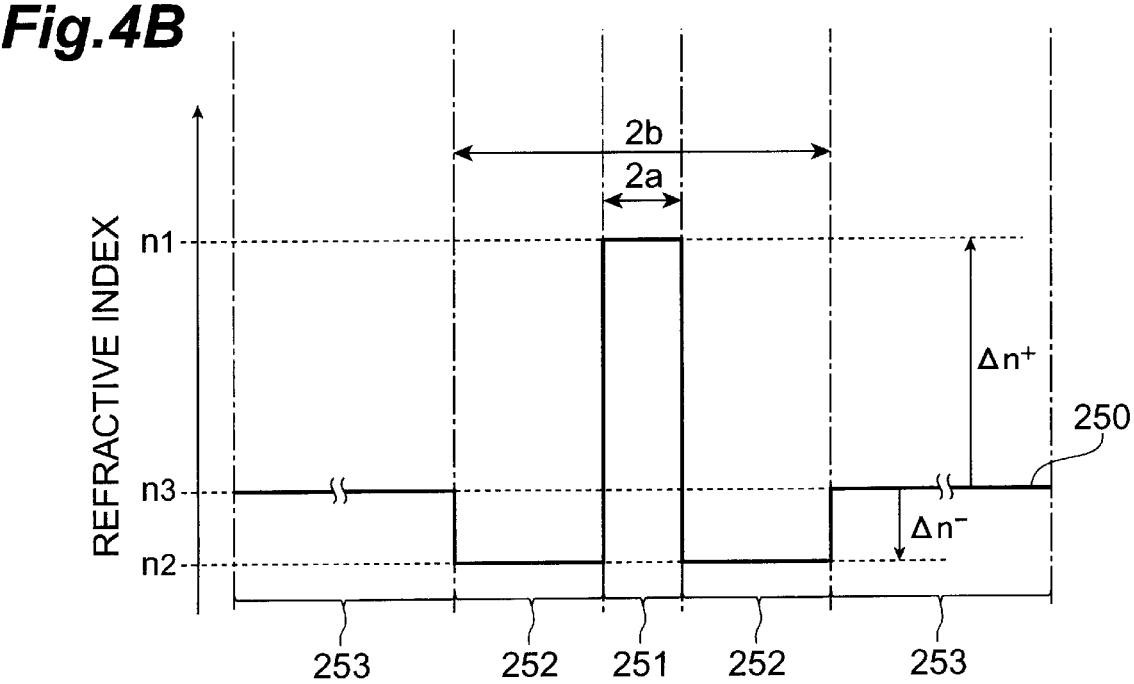

A second embodiment of the optical fiber in accordance with the present invention is an optical fiber having a depressed cladding type refractive index profile; and FIGS. 4A and 4B are views showing the cross-sectional structure and refractive index profile 250 of the optical fiber 200 in accordance with the second embodiment. The optical fiber 200 in accordance with the second embodiment is also applicable to the above-mentioned optical communication system shown in FIGS. 1A and 1B.

As shown in FIG. 4A, the optical fiber 200 in accordance with the second embodiment comprises a core region 210 extending along a predetermined axis and having a refractive index n1 and an outside diameter 2a; and a cladding region 220, disposed so as to surround the outer periphery of the core region 210, having a refractive index n2 lower than that of the core region 210 and an outside diameter 2b. The cladding region 220 comprises an inner cladding 221, disposed at the outer periphery of the core region 210, having a refractive index n2 lower than that of the core region 210 and an outside diameter 2b; and an outer cladding 222, disposed at the outer periphery of the inner cladding 221, having a refractive index n3 higher than that of the inner cladding 221; thereby constituting a depressed cladding type refractive index profile.

The refractive index profile 250 shown in FIG. 4B, on the other hand, indicates the refractive index at each location on the line L2 (line orthogonal to the predetermined axis) in FIG. 4A. Specifically, regions 251, 252, and 253 indicate the refractive indices of respective locations on the line L2 in the core region 210, inner cladding 212, and outer cladding 222, respectively. In the second embodiment, respective relative refractive index differences $\Delta n^+$ and $\Delta n^-$ of the core region 210 and inner cladding 221 with respect to the outer cladding 222 (reference region) are defined as follows:

$$\Delta n^+ = (n1 - n3)/n3$$

$$\Delta n^- = (n2 - n3)/n3$$

Here, each of the relative refractive index differences $\Delta n^+$ and $\Delta n^-$ is represented in terms of percentage, and the individual parameters in the expression may be arranged in any order. Therefore, the location yielding a relative refractive index difference with a negative value indicates that it is a location having a refractive index lower than that of the cladding region acting as the reference region.

The optical fiber 200 having such a refractive index profile 250 can be realized if, on the basis of silica glass, for example, the core region 210 is doped with Ge element, and each of the inner cladding 221 and outer cladding 222 is doped with F element. Also, it can be realized if the core region 210 is pure silica glass, and each of the inner cladding 221 and outer cladding 222 is silica doped with F element. In the latter case, the core region 210 is not doped with impurities such as Ge element, whereby the transmission loss becomes smaller by about 0.02 dB/km than that of an optical fiber whose core region 210 is doped with Ge element. Therefore, in the case where the transmission line length between repeater stations is 50 km, for example, the power of optical signals arriving at one of the repeater stations increases by about 1 dB, thereby improving the transmission quality of the whole optical communication system. Also, since the outer cladding 222 is doped with F element, hydrogen-resistance characteristics and radiation-resistance characteristics improve.

At a wavelength of 1.55 $\mu m$, the optical fiber 200 in accordance with the second embodiment also has an effective area of at least 110 $\mu m^2$, preferably 120 $\mu m^2$, more preferably 150 $\mu m^2$. Its effective area at a wavelength of 1600 nm is at least 130 $\mu m^2$. Therefore, the optical fiber 200 in accordance with the second embodiment has an effective area which is about two to three times that of the optical fiber defined in G652 and G654 standards, thereby being able to suppress the transmission loss of optical signals by 2 dB to 3 dB. As a result, the transmission quality of the optical communication system as a whole improves. More preferably, the transmission loss at a wavelength of 1.55 $\mu m$ is 0.180 dB/km or less in the optical fiber 200 in accordance with the second embodiment.

Figure 5:
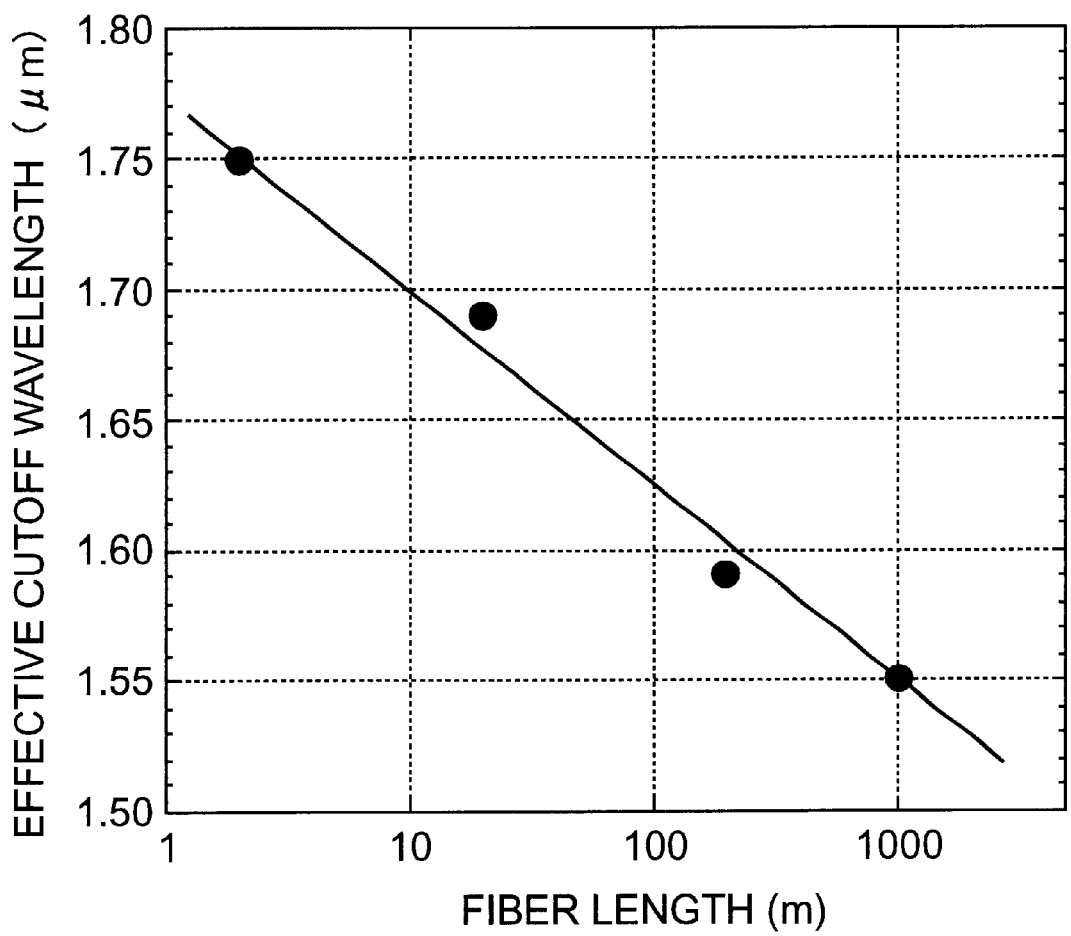
FIG. 5 is a graph showing a relationship between fiber length (m) and effective cutoff wavelength ($\mu$m)

FIG. 5 is a graph showing a relationship between fiber length and effective cutoff wavelength. The optical fiber prepared for the measurement of this graph has, at a wavelength of 1.55 $\mu m$, an effective area of 120 $\mu m^2$, a dispersion of +21.8 ps/nm/km, a dispersion slope of +0.063 ps/nm²/km, and a transmission loss of 0.170 dB/km. Here, the effective cutoff wavelength is the cutoff wavelength of $LP_{11}$ mode in the state where the optical fiber having a length indicated by the abscissa is loosely wound by one turn at a radius of 140 mm. As can be seen from this graph, if the cutoff wavelength at a fiber length of 2 m is 1.75 $\mu m$ or shorter, then this optical fiber attains a single mode at the point where the transmission distance exceeds 1 km in optical communications in the 1.55-$\mu m$ wavelength band. Thus, for satisfying a single-mode condition at a wavelength of 1.55 $\mu m$, the cutoff wavelength at a fiber length of 2 m can be up to 1.75 $\mu m$ in the case of an optical fiber having a length of at least 1 km. If the cutoff wavelength is too short, on the other hand, then the bending loss of optical fiber becomes greater in the 1.55-$\mu m$ wavelength band. Therefore, optical fibers having a cutoff wavelength of 1.30 $\mu m$ to 1.75 $\mu m$ (preferably 1.30 $\mu m$ to 1.60 $\mu m$) are suitable for optical transmission lines for long-distance optical communications such as submarine cable.

Figure 6:
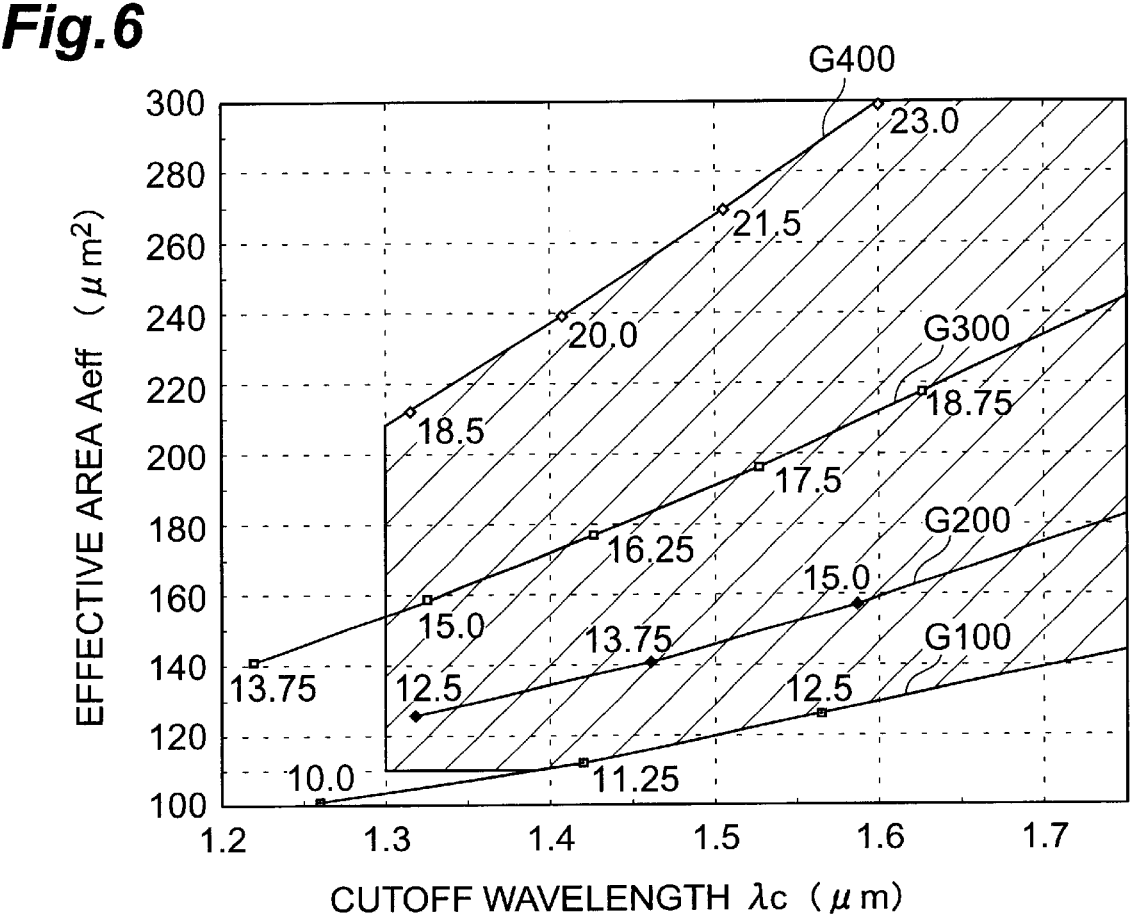
FIG. 6 is a graph for explaining a preferred range of each parameter in the optical fiber in accordance with the second embodiment.

FIG. 6 is a graph for explaining a preferred range of each parameter in the optical fiber 200 in accordance with the second embodiment. In the graph of FIG. 6, the abscissa indicates the cutoff wavelength ($\mu m$), whereas the ordinate indicates the effective area $A_{eff}$ (m²). In the optical fiber prepared for this measurement, the ratio (2b/2a) of the outside diameter 2b of the inner cladding 221 to the outside diameter 2a of the core region 210 is set to 4.0. Also, the difference ($\Delta n^+ - \Delta n^-$) between the respective relative refractive index differences $\Delta n^+$ and $n^-$ of the core region 210 and inner cladding 211 from the outer cladding 222 is set to 0.3%.

Shown in FIG. 6 are a curve G100 indicating the relationship between effective area $A_{eff}$ and cutoff wavelength $\lambda c$ in each of samples, each having a $\Delta n^+$ of +0.30% and a $\Delta n^-$ of −0.00%, in which the outside diameter 2a of core region 210 is 10.0 μm, 11.25 μm, and 12.5 μm, respectively; a curve G200 indicating the relationship between effective area $A_{eff}$ and cutoff wavelength λc in each of samples, each having a Δn⁺ of +0.25% and a Δn⁻ of −0.05%, in which the outside diameter 2a of core region 210 is 12.5 μm, 13.75 μm, and 15.0 μm, respectively; a curve G300 indicating the relationship between effective area $A_{eff}$ and cutoff wavelength λc in each of samples, each having a Δn⁺ of +0.20% and a Δn⁻ of −0.10%, in which the outside diameter 2a of the core region 210 is 13.75 μm, 15.0 μm, 16.25 μm, 17.5 μm, and 18.75 μm, respectively; and a curve G400 indicating the relationship between effective are a $A_{eff}$ and cutoff wavelength λc in each of samples, each having a Δn⁺ of +0.15% and a Δn⁻ of −0.15%, in which the outside diameter 2a of the core region 210 is 18.5 μm, 20.0 μm, 21.5 μm, and 23.0 μm, respectively.

Also, FIG. 6 shows a preferred range of parameters in the optical fiber 200 in accordance with the second embodiment by hatching. Due to the reasons mentioned above, the preferred range of cutoff wavelength is set to 1.3 μm to 1.75 μm, whereas the lower limit of effective area is set to 110 dm². The upper limit of effective area is restricted by the fact that the ground-mode light does not propagate through the optical fiber if the relative refractive index difference Δn⁺ of core region 210 and relative refractive index difference Δn⁻ of inner cladding 221 with respect to the outer cladding 222 have absolute values identical to each other.

As can be seen from the graph of FIG. 6, it is preferred that, for attaining the preferred range indicated by hatching, that the relative refractive index difference Δn⁺ of core region 210 with respect to the outer cladding 222 fall within the range of +0.15% to +0.30%, and the relative refractive index difference Δn⁻ of inner cladding 221 with respect to the outer cladding 222 fall within the range of −0.15% to −0.01%. Also, it is preferred that the outside diameter 2a of core region 210 fall within the range of 11.5 μm (more preferably 12.5 μm) to 23.0 μm.

Figure 7:
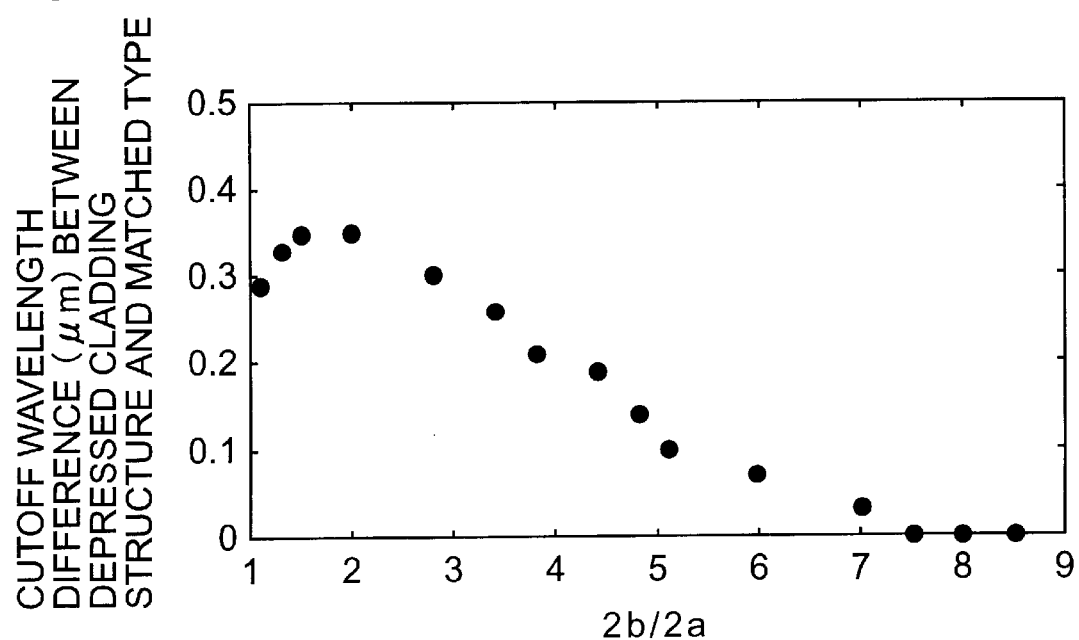
FIG. 7 is a graph showing the difference ($\mu$m) between the cutoff wavelength of an optical fiber having a depressed cladding type refractive index profile and that of an optical fiber having a matched type refractive index profile with respect to the ratio of $2b/2a$.

The relationship between the ratio 2b/2a of the outside diameter 2b of inner cladding 221 to the outside diameter 2a of core region 210 and the cutoff wavelength will now be explained. FIG. 7 is a graph plotting the difference in cutoff wavelength between an optical fiber (having a depressed cladding type refractive index profile) provided with the outer cladding 222 and an optical fiber (having a matched type refractive index profile) without the outer cladding 222 relative to the ratio 2b/2a. The optical fiber having a depressed cladding type refractive index profile prepared for measurement in this graph is set such that the outside diameter 2a of core region is 13.0 μm, the relative refractive index difference Δn⁺ of the core region with respect to the outer cladding is +0.25%, and the relative refractive index difference Δn⁻ of the inner cladding with respect to the outer cladding is −0.10%. On the other hand, the optical fiber having a matched type refractive index profile is set such that the relative refractive index difference Δn⁺ of the core region with respect to the inner cladding (cladding region) is +0.35% (Δn⁻ being 0). As can be seen from the graph of FIG. 7, the effect of causing the cutoff wavelength (μm) in the optical fiber having a depressed cladding type refractive index profile to become shorter than the cutoff wavelength in the optical fiber having a matched type refractive index profile is sufficiently obtained when the ratio 2b/2a is 7 or less, the tendency of its becoming greater as the ratio 2b/2a decreases is seen as a whole, and is maximized when the ratio 2a/2b is at a value in the vicinity of 1.5 to 2.0. If the ratio 2b/2a is 1.1 or less, then bending loss becomes greater, whereby the transmission quality of the optical communication system as a whole deteriorates. Hence, if the ratio 2b/2a of the outside diameter 2b of inner cladding to the outside diameter 2a of core region is 1.1 to 7, then the cutoff wavelength can be shortened without deteriorating bending loss, a single mode is attained in the 1.55-μm wavelength band even if the outside diameter of core region is enlarged, and the effective area can be enhanced.

Seven samples (samples 6 to 12) of the optical fiber 200 in accordance with the second embodiment will now be explained. FIG. 8 is a view showing a table listing, for each of seven samples 6 to 12 of the optical fiber 200 in accordance with the second embodiment, the outside diameter 2a of core region 210, the outside diameter 2b of inner cladding 221, the relative refractive index difference Δn⁺ of the core region 210 with respect to the outer cladding 222, the relative refractive index difference Δn⁻ of the inner cladding 221 with respect to the outer cladding, the cutoff wavelength, the effective area $A_{eff}$, dispersion (ps/nm/km), and dispersion slope (ps/nm²/km) at a wavelength of 1.55 μm, the bending loss at a wavelength of 1.55 μm when bent at a diameter of 20 mm, and the transmission loss at a wavelength of 1.55 μm. In each of samples 6 to 12, the outside diameter of the outer cladding 222 is set to 125 μm.

The optical fiber in accordance with sample 6 is set such that the outside diameter 2a of core region 210 is 14.8 μm, the outside diameter 2b of inner cladding 221 is 59.0 μm, the relative refractive index difference Δn⁺ of the core region 210 with respect to the outer cladding 222 is +0.23%, and the relative refractive index difference $Δn^{31}$ of the inner cladding 221 with respect to the outer cladding 222 is −0.07%. Also, the optical fiber in accordance with sample 6 has a cutoff wavelength of 1.45 μm and, as characteristics at a wavelength of 1.55 μm, an effective area $A_{eff}$ of 153 μm², a dispersion of 21.8 ps/nm/km, a dispersion slope of 0.063 ps/nm²/km, a bending loss which becomes 0.2 dB/m at a diameter of 20 mm, and a transmission loss of 0.170 dB/km.

The optical fiber in accordance with sample 7 is set such that the outside diameter 2a of core region 210 is 16.25 μm, the outside diameter 2b of inner cladding 221 is 65.0 μm, the relative refractive index difference Δn⁺ of the core region 210 with respect to the outer cladding 222 is +0.20%, and the relative refractive index difference Δn⁻ of the inner cladding 221 with respect to the outer cladding 222 is −0.10%. Also, the optical fiber in accordance with sample 7 has a cutoff wavelength of 1.42 μm and, as characteristics at a wavelength of 1.55 μm, an effective area $A_{eff}$ of 177 μm₂, a dispersion of 21.1 ps/nm/km, a dispersion slope of 0.063 ps/nm²/km, a bending loss which becomes 0.1 dB/m at a diameter of 20 mm, and a transmission loss of 0.173 dB/km.

The optical fiber in accordance with sample 8 is set such that the outside diameter 2a of core region 210 is 15.3 μm, the outside diameter 2b of inner cladding 221 is 61.0 μm, the relative refractive index difference Δn⁺ of the core region 210 with respect to the outer cladding 222 is +0.23%, and the relative refractive index difference Δn⁻ of the inner cladding 221 with respect to the outer cladding 222 is −0.12%. Also, the optical fiber in accordance with sample 8 has a cutoff wavelength of 1.46 μm and, as characteristics at a wavelength of 1.55 μm, an effective area $A_{eff}$ of 154 μm², a dispersion of 22.2 ps/nm/km, a dispersion slope of 0.063 ps/nm²/km, a bending loss which becomes 0.03 dB/m at a diameter of 20 mm, and a transmission loss of 0.174 dB/km.

The optical fiber in accordance with sample 9 is set such that the outside diameter 2a of core region 210 is 13.8 μm, the outside diameter 2b of inner cladding 221 is 66.0 μm, the relative refractive index difference Δn⁺ of the core region 210 with respect to the outer cladding 222 is +0.28%, and the relative refractive index difference Δn⁻ of the inner cladding 221 with respect to the outer cladding 222 is −0.14%. Also, the optical fiber in accordance with sample 9 has a cutoff wavelength of 1.49 μm and, as characteristics at a wavelength of 1.55 μm, an effective area $A_{eff}$ of 122 μm², a dispersion of 22.1 ps/nm/km, a dispersion slope of 0.062 ps/nm²/km, a bending loss which becomes 0.062 dB/m at a diameter of 20 mm, and a transmission loss of 0.171 dB/km.

The optical fiber in accordance with sample 10 is set such that the outside diameter 2a of core region 210 is 12.4 μm, the outside diameter 2b of inner cladding 221 is 55.0 μm, the relative refractive index difference Δn⁺ of the core region 210 with respect to the outer cladding 222 is +0.26%, and the relative refractive index difference Δn⁻ of the inner cladding 221 with respect to the outer cladding 222 is −0.11%. Also, the optical fiber in accordance with sample 10 has a cutoff wavelength of 1.58 μm and, as characteristics at a wavelength of 1.55 μm, an effective area $A_{eff}$ of 110 μm², a dispersion of 21.3 ps/nm/km, a dispersion slope of 0.061 ps/nm²/km, abending loss which becomes 0.02 dB/mat adiameter of 20 mm, and a transmission loss of 0.169 dB/km.

The optical fiber in accordance with sample 11 is set such that the outside diameter 2a of core region 210 is 12.8 μm, the outside diameter 2b of inner cladding 221 is 45.0 μm, the relative refractive index difference Δn⁺ of the core region 210 with respect to the outer cladding 222 is +0.25%, and the relative refractive index difference Δn⁻ of the inner cladding 221 with respect to the outer cladding 222 is −0.09%. Also, the optical fiber in accordance with sample 11 has a cutoff wavelength of 1.45 μm and, as characteristics at a wavelength of 1.55 μm, an effective area $A_{eff}$ of 119 μm², a dispersion of 21.3 ps/nm/km, a dispersion slope of 0.061 ps/nm²/km, a bending loss which becomes 0.05 dB/m at a diameter of 20 mm, and a transmission loss of 0.171 dB/km.

The optical fiber in accordance with sample 12 is set such that the outside diameter 2a of core region 210 is 12.0 μm, the outside diameter 2b of inner cladding 221 is 48.0 μm, the relative refractive index difference Δn⁺ of the core region 210 with respect to the outer cladding 222 is +0.23%, and the relative refractive index difference Δn⁻ of the inner cladding 221 with respect to the outer cladding 222 is −0.15%. Also, the optical fiber in accordance with sample 12 has a cutoff wavelength of 1.35 μm and, as characteristics at a wavelength of 1.55 μm, an effective area $A_{eff}$ of 112 μm², a dispersion of 20.9 ps/nm/km, a dispersion slope of 0.060 ps/nm²/km, a bending loss which becomes 0.10 dB/m at a diameter of 20 mm, and a transmission loss of 0.173 dB/km.

As in the foregoing, each of the respective optical fibers in accordance with the seven kinds of samples assures a single mode in the 1.55-μm wavelength band and has a sufficiently large effective area $A_{eff}$, thereby effectively restraining nonlinear optical phenomena from occurring even when optical signals in the 1.55-μm wavelength band having a high power propagate therethrough, and is preferable as an optical transmission line in long-distance optical communications. Also, each of the optical fibers has a transmission loss of 0.180 dB/km or less at a wavelength of 1.55 μm, and thus is suitable for an optical transmission line in long-distance optical communications such as submarine cable in this regard as well.

First Applied Example

A first applied example of the optical fiber 200 in accordance with the second embodiment will now be explained.

Figure 9:
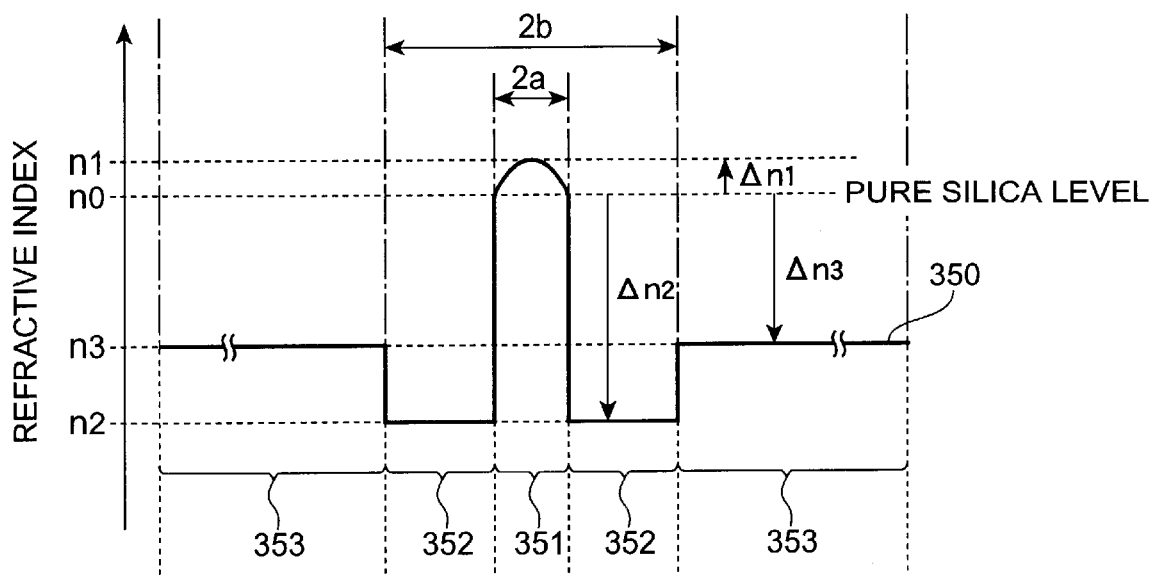
FIG. 9 is a view showing the refractive index profile of a first applied example of the optical fiber in accordance with the second embodiment.

FIG. 9 is a view showing the refractive index profile 350 of the first applied example of the optical fiber in accordance with the second embodiment. The optical fiber in accordance with the first applied example comprises a structure similar to the cross-sectional structure shown in FIG. 4A, and is characterized in that it comprises a structure capable of reducing the amount of addition of fluorine which causes transmission loss to increase, without affecting optical characteristics thereof.

Namely, the optical fiber in accordance with the first applied example comprises, as with the optical fiber 200 shown in FIG. 4A, a core region having an outside diameter 2a and a refractive index n1, an inner cladding having an outside diameter 2b and a refractive index n2 lower than that of the core region, and an outer cladding having a refractive index n3 higher than that of the inner cladding. The core region is doped with chlorine which raises the refractive index, whereas the inner and outer claddings are doped with fluorine which lowers the refractive index. The respective relative refractive index differences Δn1, Δn2, Δn3 of the core region, inner cladding, and outer cladding are given by the following expressions:

$$\Delta n1=(n1-n0)/n0$$

$$\Delta n2=(n2-n0)/n0$$

$$\Delta n3=(n3-n0)/n0$$

Here, the relative refractive index differences Δn1 to Δn3 are expressed in terms of percentage, and n0 is the refractive index of pure silica glass. Also, the individual parameters in each of the above-mentioned expressions may be arranged in any order, so that the refractive index of locations where the relative refractive index difference takes a negative value indicates that it is lower than the refractive index n0 of pure silica glass.

Further, in the refractive index profile 350 of FIG. 9, regions 351, 352, and 353 indicate respective refractive indices of locations corresponding to the core region 210, inner cladding 221, and outer cladding 222 in FIG. 4A.

FIG. 10 is a table showing structural parameters and optical characteristics at awavelength of 1.55 μm in samples 13 to 15 of the optical fiber in accordance with the above-mentioned first applied example.

As can be seen from the table of FIG. 10, the optical fiber in accordance with sample 13 is set such that the outside diameter 2a of core region is 12.6 μm, the outside diameter 2b of inner cladding is 43.8 μm, the relative refractive index difference Δn1 of the core region with respect to pure silica glass is 0.04%, the relative refractive index difference Δn2 of the inner cladding with respect to pure silica glass is −0.30%, and the relative refractive index difference Δn3 of the outer cladding with respect to pure silica glass is −0.21%. Also, the optical fiber in accordance with sample 13 has an effective area $A_{eff}$ of 115 μm², a cutoff wavelength of 1.42 μm, and, as characteristics at a wavelength of 1.55 μm, a dispersion of 21.3 ps/nm/km, a dispersion slope of 0.061 ps/nm²/km, a bending loss which becomes 0.3 dB/m at a diameter of 20 mm, and a transmission loss of 0.169 dB/km.

The optical fiber in accordance with sample 14 is set such that the outside diameter 2a of core region is 12.9 μm, the outside diameter 2b of inner cladding is 45.0 μm, the relative refractive index difference Δn1 of the core region with respect to pure silica glass is 0.11%, the relative refractive index difference Δn2 of the inner cladding with respect to pure silica glass is −0.27%, and the relative refractive index difference Δn3 of the outer cladding with respect to pure silica glass is −0.16%. Also, the optical fiber in accordance with sample 14 has an effective area $A_{eff}$ of 113 $\mu m^2$, a cutoff wavelength of 1.45 $\mu m$, and, as characteristics at a wavelength of 1.55 $\mu m$, a dispersion of 21.3 ps/nm/km, a dispersion slope of 0.061 ps/nm$^2$/km, a bending loss which becomes 0.2 dB/m at a diameter of 20 mm, and a transmission loss of 0.167 dB/km.

The optical fiber in accordance with sample 15 is set such that the outside diameter 2a of core region is 12.6 $\mu m$, the outside diameter 2b of inner cladding is 45.5 $\mu m$, the relative refractive index difference Δn1 of the core region with respect to pure silica glass is 11%, the relative refractive index difference Δn2 of the inner cladding with respect to pure silica glass is −0.23%, and the relative refractive index difference Δn3 of the outer cladding with respect to pure silica glass is −0.14%. Also, the optical fiber in accordance with sample 15 has an effective area $A_{eff}$ of 113 $\mu m^2$, a cutoff wavelength of 1.40 $\mu m$, and, as characteristics at a wavelength of 1.55 $\mu m$, a dispersion of 21.2 ps/nm/km, a dispersion slope of 0.061 ps/nm$^2$/km, a bending loss which becomes 0.4 dB/m at a diameter of 20 mm, and a transmission loss of 0.165 dB/km.

Figure 11:
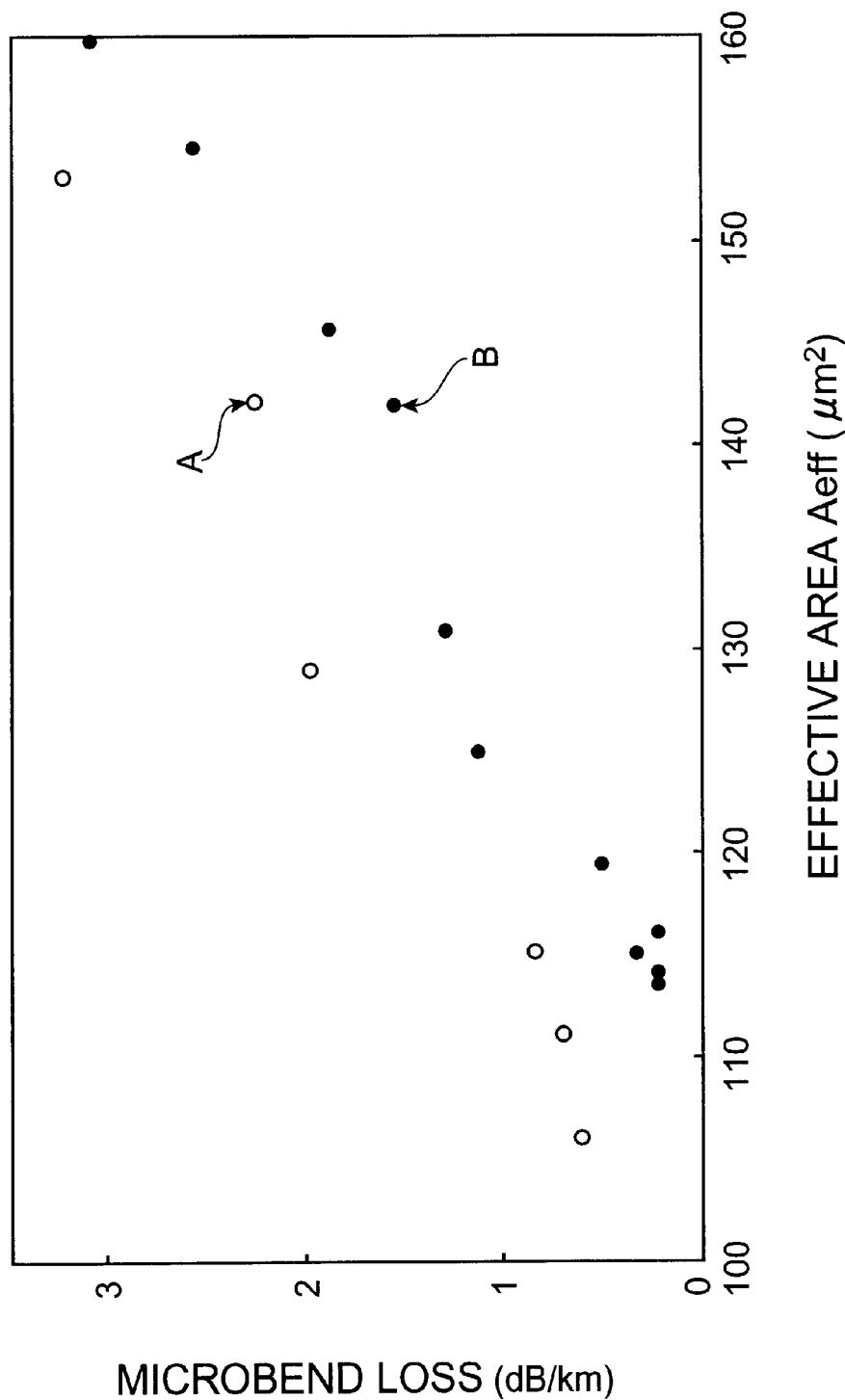
FIG. 11 is a graph showing a relationship between effective area $A_{eff}(\mu m^2)$ and microbend loss (dB/km)

FIG. 11 is a graph plotting a relationship between effective area $A_{eff}$ ($\mu^2$) and microbend loss (dB/km) concerning samples having a matched type refractive index profile (having the structure shown in FIGS. 2A and 2B) in accordance with the first embodiment and a depressed cladding type refractive index profile (having the refractive index profile shown in FIGS. 4A and 4B) in accordance with the second embodiment. In this graph, white circles A indicate data of samples having a matched type refractive index profile, whereas black circles B indicate data of samples having a depressed cladding type refractive index profile.

From this graph, it can be seen that the effect of lowering the microbend loss is greater in the optical fiber comprising a depressed cladding structure. For the measurement concerning each plotted sample, the optical fiber was wound at a tension of 100 g about a bobbin having a barrel diameter of 280 mm whose surface is covered with JIS#1000 sandpaper, its resulting amount of increase in loss was measured, and the amount of increase in loss was taken as microbend loss.

Second Applied Example

Figure 12:
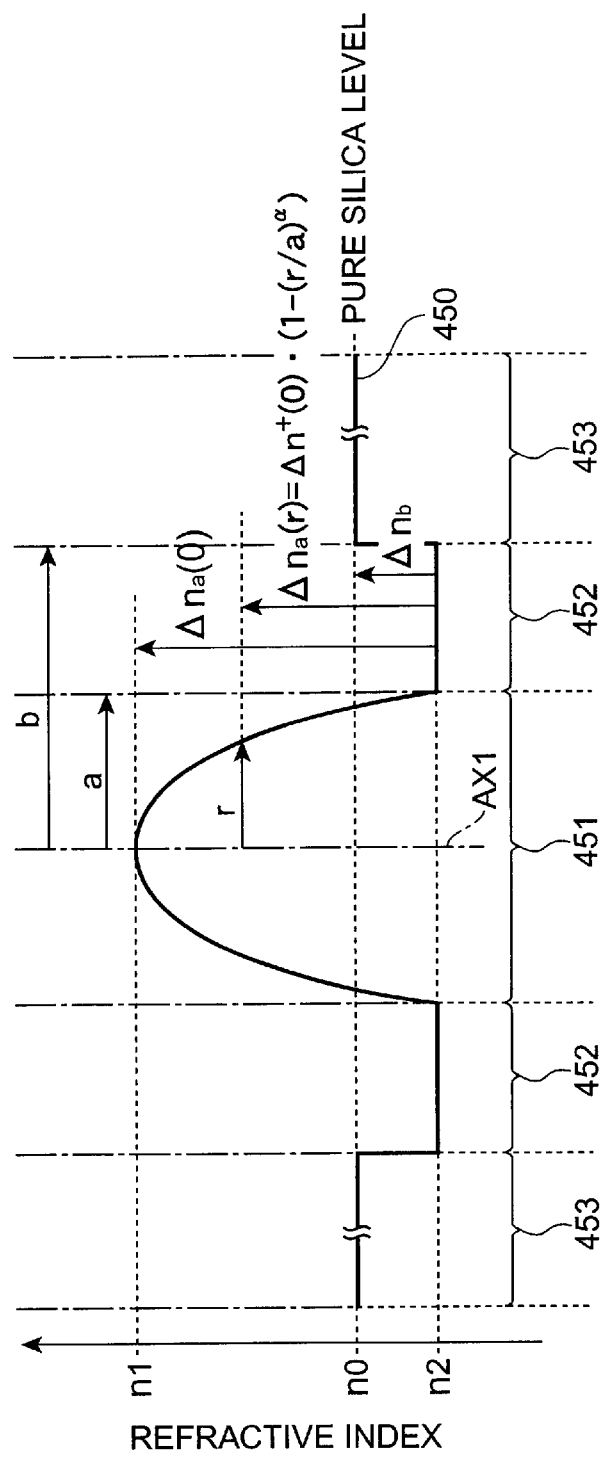
FIG. 12 is a view showing the refractive index profile of a second applied example of the optical fiber in accordance with the second embodiment.

The refractive index profile of the optical fiber in accordance with the present invention may have a shape which, in its core region, changes from the center part of the core region to the outer peripheral part thereof. FIG. 12 is a view showing the refractive index profile 450 of a second applied example of the optical fiber 200 in accordance with the second embodiment, which has a shape in which the refractive index in the core region decreases from the center part to its periphery as in the above-mentioned first applied example. The second applied example also has a structure similar to the cross-sectional structure shown in FIG. 4A. Namely, as with the optical fiber 200, the optical fiber in accordance with the second applied example has a core region having an outside diameter 2a and a maximum refractive index n1 in its center part; an inner cladding having an outside diameter 2b and a refractive index n2 lower than that of the core region; and an outer cladding, made of pure silica glass, having a refractive index n0 higher than that of the inner cladding. The core region is doped with germanium which raises the refractive index, whereas the inner cladding is doped with fluorine which lowers the refractive index.

In the refractive index profile 450 of the optical fiber in accordance with the second applied example shown in FIG. 12, regions 451, 452, and 453 indicate respective refractive indices of locations corresponding to the core region 210, inner cladding 221, and outer cladding 222 shown in FIG. 4A. Here, AX1 shown in FIG. 12 is the center axis of the optical fiber in accordance with the second applied example.

The relative refractive index difference $\Delta n_a(0)$ of the center part of core region and relative refractive index difference $\Delta n_b$ of the outer cladding with reference to the inner cladding are given, respectively, by the following expressions:

$$\Delta n_a(0) = (n1-n2)/n2$$

$$\Delta n_b = (n0-n2)/n2$$

In addition, in a cross section of the core region, the relative refractive index difference $\Delta n_a(r)$ of a location radially separated by a distance r ($0 \leq r \leq A$) from the center part of the core region with respect to the inner cladding is given by the following approximate expression:

$$\Delta n_\alpha(r) = \Delta n_\alpha(0) \cdot |1 - (r/a)^\alpha| \tag{4}$$

where $\Delta n_a(0)$ is the relative refractive index difference of the center part of the core region with respect to the inner cladding; and α is 1 to 10.

FIG. 13 is a table showing structural parameters and optical characteristics of samples 16 to 24 of the optical fiber in accordance with the second applied example comprising the above-mentioned structure.

As can be seen from the table of FIG. 13, the optical fiber in accordance with sample 16 is set such that the outside diameter 2a of core region is 21.0 $\mu m$, the outside diameter 2b of inner cladding is 50.2 $\mu m$, the relative refractive index difference $\Delta n_a(0)$ of the center part of core region with respect to the innercladding is +0.40%, and the relative refractive index difference $\Delta n_b$ of the outer cladding with respect to the inner cladding is 0.08%. Also, the parameter in the above-mentioned approximate expression (4) representing the relative refractive index difference $\Delta n_a(r)$ in the core region with respect to the inner cladding is set to 1.0. The optical fiber in accordance with sample 16 has, as characteristics at a wavelength of 1.55 $\mu m$, a dispersion of 19.25 ps/nm/km, a dispersion slope of 0.064 ps/nm$^2$/km, and an effective area $A_{eff}$ of 120 $\mu m^2$ as well as a cutoff wavelength of 1.45 $\mu m$.

The optical fiber in accordance with sample 17 is set such that the outside diameter 2a of core region is 19.3 $\mu m$, the outside diameter 2b of inner cladding is 49.5 $\mu m$, the relative refractive index difference $\Delta n_a(0)$ of the center part of core region with respect to the inner cladding is +0.37%, and the relative refractive index difference $\Delta n_b$ of the outer cladding with respect to the inner cladding is 0.08%. Also, the parameter α in the above-mentioned approximate expression (4) representing the relative refractive index difference $\Delta n_a(r)$ in the core region with respect to the inner cladding is set to 1.5. The optical fiber in accordance with sample 17 has, as characteristics at a wavelength of 1.55 $\mu m$, a dispersion of 19.94 ps/nm/km, a dispersion slope of 0.063 ps/nm$^2$/km, and an effective area $A_{eff}$ of 120 $\mu m$ as well as a cutoff wavelength of 1.44 $\mu m$.

The optical fiber in accordance with sample 18 is set such that the outside diameter 2a of core region is 17.4 $\mu m$, the outside diameter 2b of inner cladding is 49.0 $\mu m$, the relative refractive index difference $\Delta n_a(0)$ of the center part of core region with respect to the inner cladding is +0.35%, and the relative refractive index difference $\Delta n_b$ of the outer cladding with respect to the inner cladding is 0.07%. Also, the parameter $\alpha$ in the above-mentioned approximate expression (4) representing the relative refractive index difference $\Delta n_a(r)$ in the core region with respect to the inner cladding is set to 2.0. The optical fiber in accordance with sample 18 has, as characteristics at a wavelength of 1.55 μm, a dispersion of 20.12 ps/nm/km, a dispersion slope of 0.063 ps/nm²/km, and an effective area $A_{eff}$ of 118 gM² as well as a cutoff wavelength of 1.44 μm.

The optical fiber in accordance with sample 19 is set such that the outside diameter 2a of core region is 16.5 μm, the outside diameter 2b of inner cladding is 51.4 μm, the relative refractive index difference $\Delta n_a(0)$ of the center part of core region with respect to the inner cladding is +0.34%, and the relative refractive index difference $\Delta n_b$ of the outer cladding with respect to the inner cladding is 0.08%. Also, the parameter $\alpha$ in the above-mentioned approximate expression (4) representing the relative refractive index difference $\Delta n_a(r)$ in the core region with respect to the inner cladding is set to 3.0. The optical fiber in accordance with sample 19 has, as characteristics at a wavelength of 1.55 μm, a dispersion of 20.55 ps/nm/km, a dispersion slope of 0.062 ps/nm²/km, and an effective area $A_{eff}$ of 119 m² as well as a cutoff wavelength of 1.45 μm.

The optical fiber in accordance with sample 20 is set such that the outside diameter 2a of core region is 15.3 μm, the outside diameter 2b of inner cladding is 51.0 μm, the relative refractive index difference $\Delta n_a(0)$ of the center part of core region with respect to the inner cladding is +0.33%, and the relative refractive index difference $\Delta n_b$ of the outer cladding with respect to the inner cladding is 0.07%. Also, the parameter $\alpha$ in the above-mentioned approximate expression (4) representing the relative refractive index difference $\Delta n_a(r)$ in the core region with respect to the inner cladding is set to 4.0. The optical fiber in accordance with sample 20 has, as characteristics at a wavelength of 1.55 μm, a dispersion of 20.71 ps/nm/km, a dispersion slope of 0.062 ps/nm²/km, and an effective area $A_{eff}$ of 118 μm² as well as a cutoff wavelength of 1.45 μm.

The optical fiber in accordance with sample 21 is set such that the outside diameter 2a of core region is 14.5 μm, the outside diameter 2b of inner cladding is 50.2 μm, the relative refractive index difference $\Delta n_a(0)$ of the center part of core region with respect to the inner cladding is +0.32%, and the relative refractive index difference $\Delta n_b$ of the outer cladding with respect to the inner cladding is 0.07%. Also, the parameter $\alpha$ in the above-mentioned approximate expression (4) representing the relative refractive index difference $\Delta n_a(r)$ in the core region with respect to the inner cladding is set to 6.0. The optical fiber in accordance with sample 21 has, as characteristics at a wavelength of 1.55 μm, a dispersion of 20.85 ps/nm/km, a dispersion slope of 0.061 ps/nm²/km, and an effective area $A_{eff}$ of 119 μm² as well as a cutoff wavelength of 1.45 μm.

The optical fiber in accordance with sample 22 is set such that the outside diameter 2a of core region is 14.1 μm, the outside diameter 2b of inner cladding is 49.8 μm, the relative refractive index difference $\Delta n_a(0)$ of the center part of core region with respect to the inner cladding is +0.32%, and the relative refractive index difference $\Delta n_b$ of the outer cladding with respect to the inner cladding is 0.07%. Also, the parameter $\alpha$ in the above-mentioned approximate expression (4) representing the relative refractive index difference $\Delta n_a(r)$ in the core region with respect to the inner cladding is set to 8.0. The optical fiber in accordance with sample 22 has, as characteristics at a wavelength of 1.55 μm, a dispersion of 20.91 ps/nm/km, a dispersion slope of 0.061 ps/nm²/km, and an effective area $A_{eff}$ of 117 μm² as well as a cutoff wavelength of 1.44 μm.

The optical fiber in accordance with sample 23 is set such that the outside diameter 2a of core region is 13.7 μm, the outside diameter 2b of inner cladding is 48.9 μm, the relative refractive index difference $\Delta n_a(0)$ of the center part of core region with respect to the inner cladding is +0.32%, and the relative refractive index difference $\Delta n_b$ of the outer cladding with respect to the inner cladding is 0.08%. Also, the parameter $\alpha$ in the above-mentioned approximate expression (4) representing the relative refractive index difference $\Delta n_a(r)$ in the core region with respect to the inner cladding is set to 10.0. The optical fiber in accordance with sample 23 has, as characteristics at a wavelength of 1.55 μm, a dispersion of 20.97 ps/nm/km, a dispersion slope of 0.061 ps/nm²/km, and an effective area $A_{eff}$ of 119 μm² as well as a cutoff wavelength of 1.44 μm.

The optical fiber in accordance with sample 24 is set such that the outside diameter 2a of core region is 12.4 μm, the outside diameter 2b of inner cladding is 50.1 μm, the relative refractive index difference $\Delta n_a(0)$ of the center part of core region with respect to the inner cladding is +0.32%, and the relative refractive index difference $\Delta n_b$ of the outer cladding with respect to the inner cladding is 0.08%. Also, the parameter $\alpha$ in the above-mentioned approximate expression (4) representing the relative refractive index difference $\Delta n_a(r)$ in the core region with respect to the inner cladding is set to $\infty$. The optical fiber in accordance with sample 24 has, as characteristics at a wavelength of 1.55 μm, a dispersion of 21.01 ps/nm/km, a dispersion slope of 0.061 ps/nm²/km, and an effective area $A_{eff}$ of 117 μm² as well as a cutoff wavelength of 1.46 μm.

Figure 14:
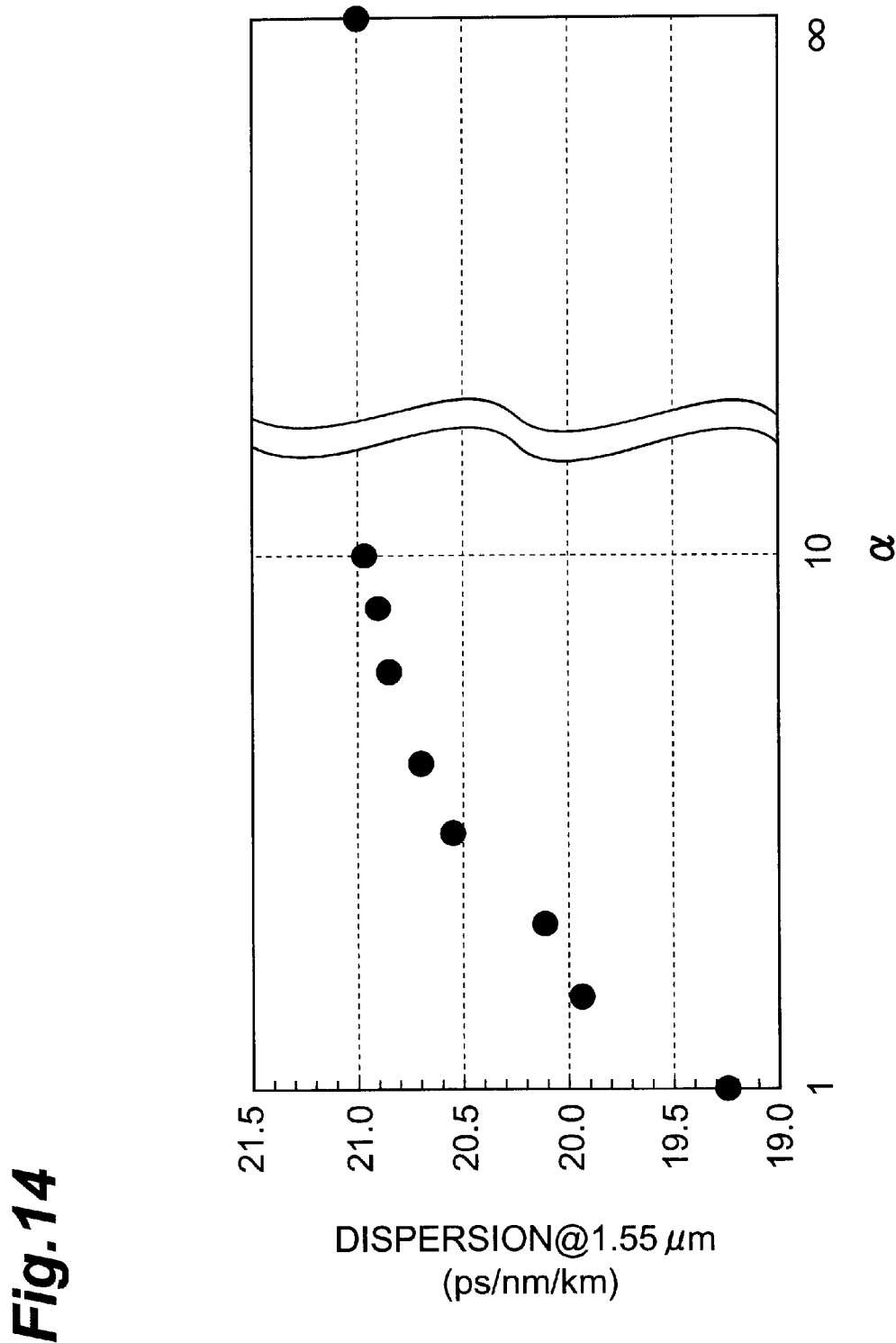
FIG. 14 is a graph showing a relationship between the parameter $\alpha$ in the expression approximating the refractive index profile of the core region in the optical fiber in accordance with the second applied example and the dispersion (ps/nm/km) of the optical fiber in accordance with the second applied example at a wavelength of 1.55 $\mu$m.

FIG. 14 is a graph plotting a relationship between parameter $\alpha$ and dispersion (ps/nm/km) at a wavelength of 1.55 μm concerning the above-mentioned samples 16 to 24. As can be seen from this graph, the range of parameter $\alpha$ appropriate for causing the dispersion at a wavelength of 1.55 μm to become 21 ps/nm/km or less is 1 to 10.

Third Applied Example

Figure 15:
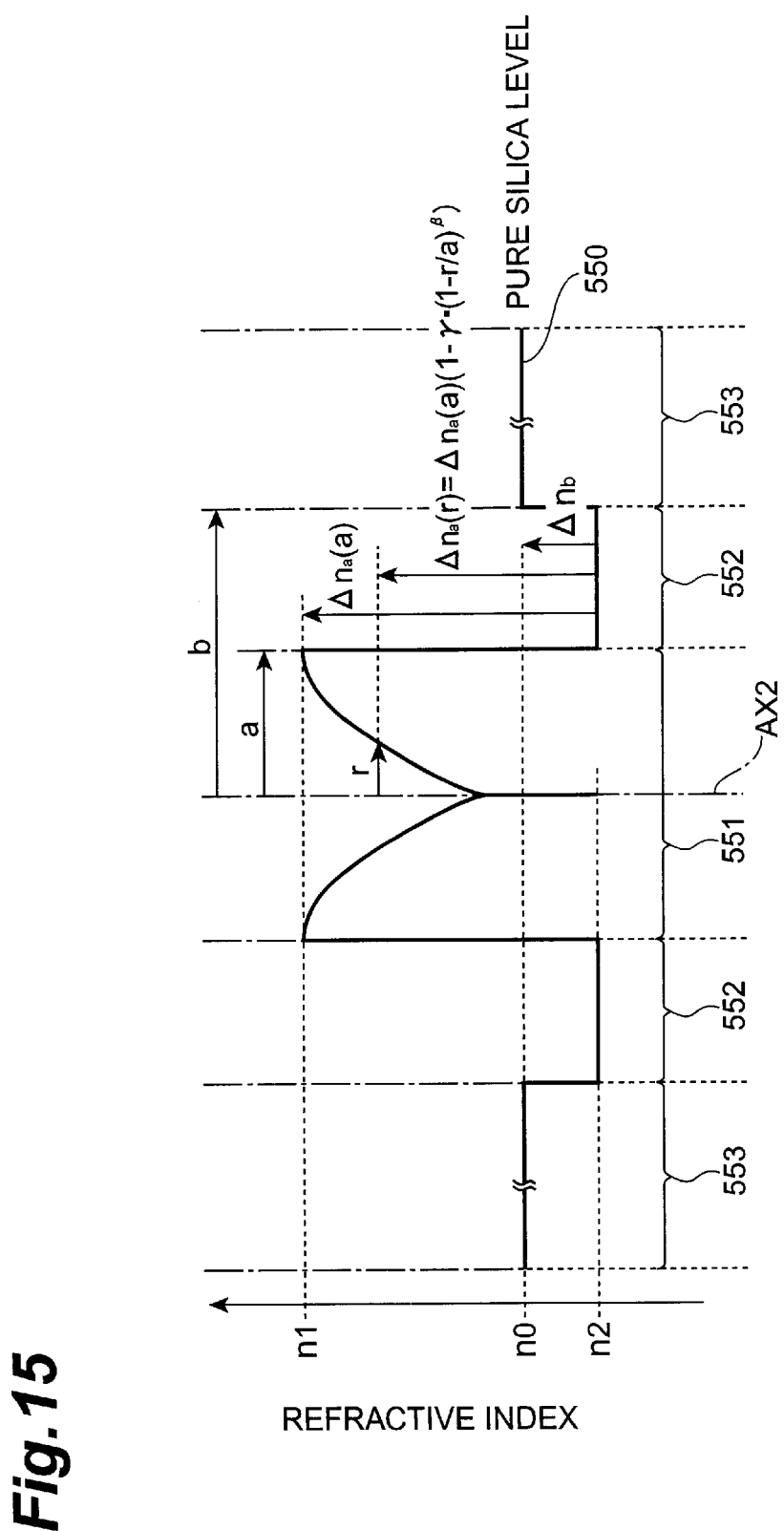
FIG. 15 is a view showing the refractive index profile of a third applied example of the optical fiber in accordance with the second embodiment.

A third applied example of the optical fiber 200 in accordance with the second embodiment has a depressed cladding type refractive index profile in which, contrary to that of the above-mentioned second applied example, the refractive index in the core region decreases from the periphery toward the center part. FIG. 15 is a view showing the refractive index profile 550 of the optical fiber in accordance with the third applied example, which has a structure similar to the above-mentioned cross-sectional structure shown in FIG. 4A.

Namely, as with the optical fiber 200, the optical fiber in accordance with the third applied example comprises a core region having an outside diameter 2a and a maximum refractive index n1 in its peripheral part; an inner cladding having an outside diameter 2b and a refractive index n2 lower than that of the core region; and an outer cladding, made of pure silica glass, having a refractive index n0 higher than that of the inner cladding. The core region is doped with chlorine which raises the refractive index, whereas the inner cladding is doped with fluorine which lowers the refractive index.

In the refractive index profile 550 concerning the third applied example shown in FIG. 15, regions 451, 452, and 453 indicate respective refractive indices of locations corresponding to the core region 210, inner cladding 221, and outer cladding 222 shown in FIG. 4A. Here, AX2 shown in FIG. 15 is the center axis of the optical fiber in accordance with the third applied example.

The relative refractive index difference $\Delta n_a(a)$ of the part corresponding to the outer periphery of the core region (location separated from the center of the core region by a distance a) and relative refractive index difference $\Delta n_b$ of the outer cladding with reference to the inner cladding are given, respectively, by the following expressions:

$$\Delta n_a(\alpha)=(n1-n2)/n2$$

$$\Delta n_b=(n0-n2)/n2$$

In addition, in a cross section of the core region, the relative refractive index difference $\Delta n_a(r)$ of a location radially separated by a distance r ($0 \leq r \leq \alpha$) from the center part of the core region with respect to the inner cladding is given by the following approximate expression:

$$\Delta n_a(r)=\Delta n_a(\alpha) \cdot |1-\gamma \cdot (1-r/\alpha)^\beta| \quad (5)$$

where $\Delta n_a(a)$ is the relative refractive index difference of the location corresponding to the outer periphery of the core region with respect to the inner cladding of the cladding region;

β is 1 to 10; and

γ is a positive real number.

FIG. 16 is a table showing structural parameters and optical characteristics of samples 25 to 34 of the optical fiber in accordance with the third applied example comprising the above-mentioned structure.

As can be seen from the table of FIG. 16, the optical fiber in accordance with sample 25 is set such that the outside diameter 2a of core region is 10.2 μm, the outside diameter 2b of inner cladding is 51.0 μm, the relative refractive index difference $\Delta n_a(a)$ of the outer peripheral part of core region with respect to the inner cladding is +0.58%, and the relative refractive index difference $\Delta n_b$ of the outer cladding with respect to the inner cladding is 0.08%. In samples shown in FIG. 16, γ equals to 1. Also, the parameter β in the above-mentioned approximate expression (5) representing the relative refractive index difference $\Delta n_a(r)$ in the core region with respect to the inner cladding is set to 1.0. The optical fiber in accordance with sample 25 has, as characteristics at a wavelength of 1.55 μm, a dispersion of 19.48 ps/nm/km, a dispersion slope of 0.063 ps/nm²/km, and an effective area $A_{eff}$ of 116 μm² as well as a cutoff wavelength of 1.45 μm.

The optical fiber in accordance with sample 26 is set such that the outside diameter 2a of core region is 10.6 μm, the outside diameter 2b of inner cladding is 50.4 μm, the relative refractive index difference $\Delta n_a(a)$ of the outer peripheral part of core region with respect to the inner cladding is +0.49%, and the relative refractive index difference $\Delta n_b$ of the outer cladding with respect to the inner cladding is 0.08%. Also, the parameter β in the above-mentioned approximate expression (5) representing the relative refractive index difference $\Delta na(r)$ in the core region with respect to the inner cladding is set to 1.5. The optical fiber in accordance with sample 26 has, as characteristics at a wavelength of 1.55 μm, a dispersion of 19.99 ps/nm/km, a dispersion slope of 0.062 ps/nm²/km, and an effective area $A_{eff}$ of 117 μm as well as a cutoff wavelength of 1.46 μm.

The optical fiber in accordance with sample 27 is set such that the outside diameter 2a of core region is 10.8 μm, the outside diameter 2b of inner cladding is 49.0 μm, the relative refractive index difference $\Delta n_a(a)$ of the outer peripheral part of core region with respect to the inner cladding is +0.44%, and the relative refractive index difference $\Delta n_b$ of the outer cladding with respect to the inner cladding is 0.07%. Also, the parameter β in the above-mentioned approximate expression (5) representing the relative refractive index difference $\Delta n_a(r)$ in the core region with respect to the inner cladding is set to 2.0. The optical fiber in accordance with sample 27 has, as characteristics at a wavelength of 1.55 μm, a dispersion of 20.28 ps/nm/km, a dispersion slope of 0.062 ps/nm²/km, and an effective area $A_{eff}$ of 118 m² as well as a cutoff wavelength of 1.44 μm.

The optical fiber in accordance with sample 28 is set such that the outside diameter 2a of core region is 11.1 μm, the outside diameter 2b of inner cladding is 49.2 μm, the relative refractive index difference $\Delta n_a(a)$ of the outer peripheral part of core region with respect to the inner cladding is +0.40%, and the relative refractive index difference $\Delta n_b$ of the outer cladding with respect to the inner cladding is 0.07%. Also, the parameter β in the above-mentioned approximate expression (5) representing the relative refractive index difference $\Delta n_a(r)$ in the core region with respect to the inner cladding is set to 3.0. The optical fiber in accordance with sample 28 has, as characteristics at a wavelength of 1.55 μm, a dispersion of 20.45 ps/nm/km, a dispersion slope of 0.061 ps/nm²/km, and an effective area $A_{eff}$ of 116 μm² as well as a cutoff wavelength of 1.45 μm.

The optical fiber in accordance with sample 29 is set such that the outside diameter 2a of core region is 11.4 μm, the outside diameter 2b of inner cladding is 49.6 μm, the relative refractive index difference $\Delta n_a(a)$ of the outer peripheral part of core region with respect to the inner cladding is +0.37%, and the relative refractive index difference $\Delta n_b$ of the outer cladding with respect to the inner cladding is 0.08%. Also, the parameter β in the above-mentioned approximate expression (5) representing the relative refractive index difference $\Delta n_a(r)$ in the core region with respect to the inner cladding is set to 4.0. The optical fiber in accordance with sample 29 has, as characteristics at a wavelength of 1.55 μm, a dispersion of 20.76 ps/nm/km, a dispersion slope of 0.061 ps/nm²/km, and an effective area $A_{eff}$ of 118 μm² as well as a cutoff wavelength of 1.46 μm.

The optical fiber in accordance with sample 30 is set such that the outside diameter 2a of core region is 11.7 μm, the outside diameter 2b of inner cladding is 49.6 μm, the relative refractive index difference $\Delta n_a(a)$ of the outer peripheral part of core region with respect to the inner cladding is +0.35%, and the relative refractive index difference $\Delta n_b$ of the outer cladding with respect to the inner cladding is 0.07%. Also, the parameter β in the above-mentioned approximate expression (5) representing the relative refractive index difference $\Delta n_a(r)$ in the core region with respect to the inner cladding is set to 6.0. The optical fiber in accordance with sample 30 has, as characteristics at a wavelength of 1.55 μm, a dispersion of 20.84 ps/nm/km, a dispersion slope of 0.061 ps/nm²/km, and an effective area $A_{eff}$ of 118 μm² as well as a cutoff wavelength of 1.46 μm.

The optical fiber in accordance with sample 31 is set such that the outside diameter 2a of core region is 11.8 μm, the outside diameter 2b of inner cladding is 50.2 μm, the relative refractive index difference $\Delta n_a(a)$ of the outer peripheral part of core region with respect to the inner cladding is +0.34%, and the relative refractive index difference $\Delta n_b$ of the outer cladding with respect to the inner cladding is 0.07%. Also, the parameter β in the above-mentioned approximate expression (5) representing the relative refractive index difference $\Delta n_a(r)$ in the core region with respect to the inner cladding is set to 8.0. The optical fiber in accordance with sample 31 has, as characteristics at a wavelength of 1.55 μm, a dispersion of 20.89 ps/nm/km, a dispersion slope of 0.061 ps/nm²/km, and an effective area $A_{eff}$ of 115 μm as well as a cutoff wavelength of 1.45/μm.

The optical fiber in accordance with sample 32 is set such that the outside diameter 2a of core region is 11.9 μm, the outside diameter 2b of inner cladding is 49.4 μm, the relative refractive index difference $\Delta n_a(a)$ of the outer peripheral part of core region with respect to the inner cladding is +0.33%, and the relative refractive index difference $\Delta n_b$ of the outer cladding with respect to the inner cladding is 0.07%. Also, the parameter β in the above-mentioned approximate expression (5) representing the relative refractive index difference $\Delta n_a(r)$ in the core region with respect to the inner cladding is set to 10.0. The optical fiber in accordance with sample 32 has, as characteristics at a wavelength of 1.55 μm, a dispersion of 20.92 ps/nm/km, a dispersion slope of 0.061 ps/nm²/km, and an effective area $A_{eff}$ of 117 μm² as well as a cutoff wavelength of 1.45 μm.

The optical fiber in accordance with sample 33 is set such that the outside diameter 2a of core region is 21.1 μm, the outside diameter 2b of inner cladding is 50.4 μm, the relative refractive index difference $\Delta n_a(a)$ of the outer peripheral part of core region with respect to the inner cladding is +0.32%, and the relative refractive index difference $\Delta n_b$ of the outer cladding with respect to the inner cladding is 0.08%. Also, the parameter β in the above-mentioned approximate expression (5) representing the relative refractive index difference $\Delta n_a(r)$ in the core region with respect to the inner cladding is set to 15.0. The optical fiber in accordance with sample 33 has, as characteristics at a wavelength of 1.55 μm, a dispersion of 20.97 ps/nm/km, a dispersion slope of 0.061 ps/nm²/km, and an effective area $A_{eff}$ of 118 μm² as well as a cutoff wavelength of 1.44 μm.

The optical fiber in accordance with sample 34 is set such that the outside diameter 2a of core region is 12.4 μm, the outside diameter 2b of inner cladding is 50.1 μm, the relative refractive index difference $\Delta n_a(a)$ of the outer peripheral part of core region with respect to the inner cladding is +0.32%, and the relative refractive index difference $\Delta n_b$ of the outer cladding with respect to the inner cladding is 0.08%. Also, the parameter β in the above-mentioned approximate expression (5) representing the relative refractive index difference $\Delta n_a(r)$ in the core region with respect to the inner cladding is set to ∞. The optical fiber in accordance with sample 34 has, as characteristics at a wavelength of 1.55 μm, a dispersion of 21.01 ps/nm/km, a dispersion slope of 0.061 ps/nm²/km, and an effective area $A_{eff}$ of 117 μm² as well as a cutoff wavelength of 1.46 μm.

Figure 17:
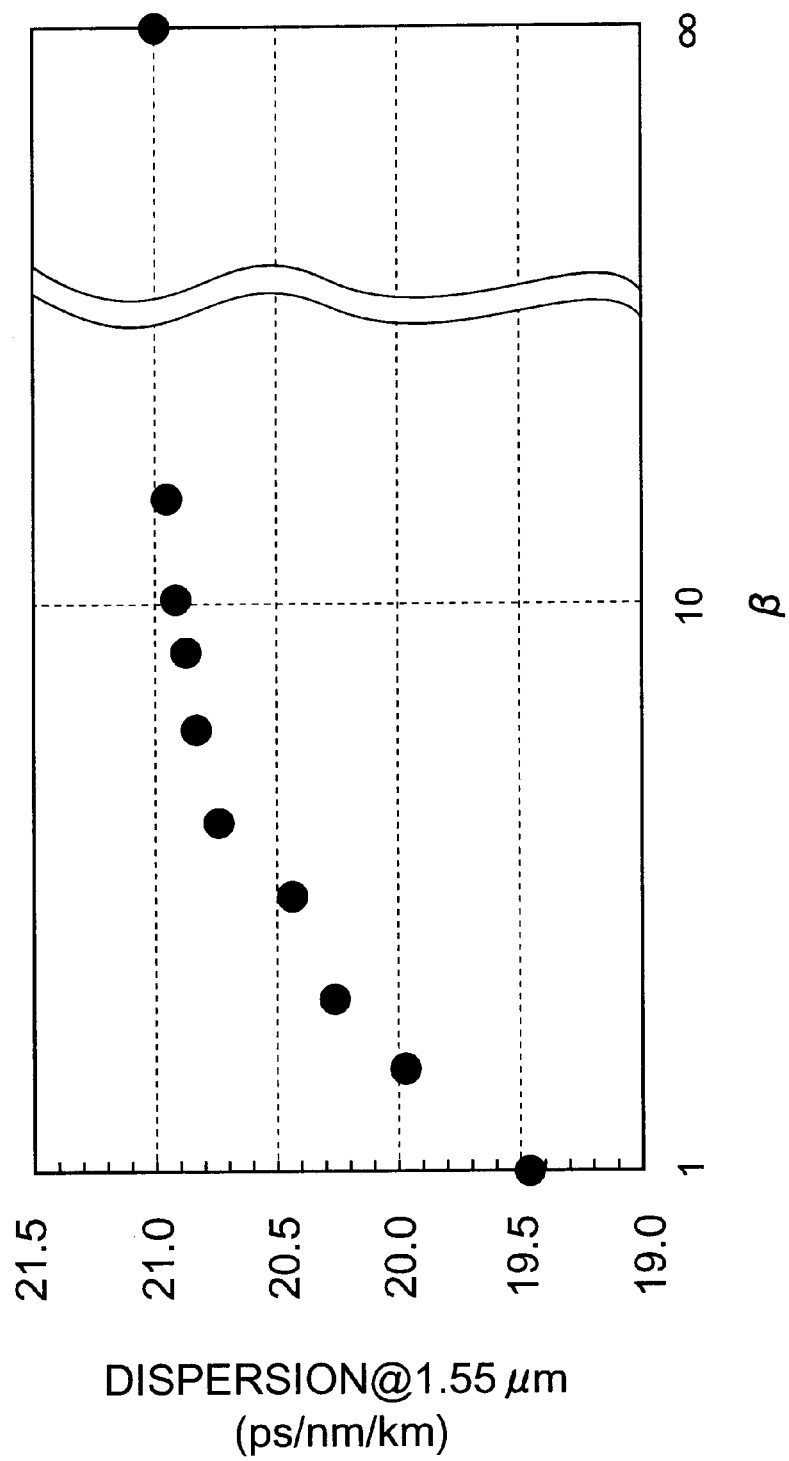
FIG. 17 is a graph showing a relationship between the parameter $\beta$ in the expression approximating the refractive index profile of the core region in the optical fiber in accordance with the third applied example and the dispersion (ps/nm/km) of the optical fiber in accordance with the third applied example at a wavelength of 1.55 $\mu$m.

FIG. 17 is a graph plotting a relationship between parameter β and dispersion at a wavelength of 1.55 μm concerning the above-mentioned samples 25 to 34. As can be seen from this graph, the range of parameter β appropriate for causing the dispersion at a wavelength of 1.55 μm to become 21 ps/nm/km or less is 1 to 10.

Figure 18A:
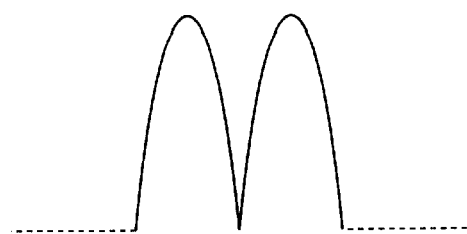
FIGS. 18A to 18E are views schematically showing respective form patterns applicable to the refractive index profile of the core region.
Figure 18B:
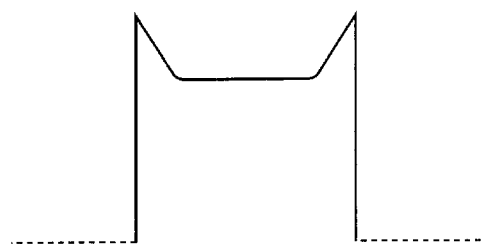
Figure 18C:
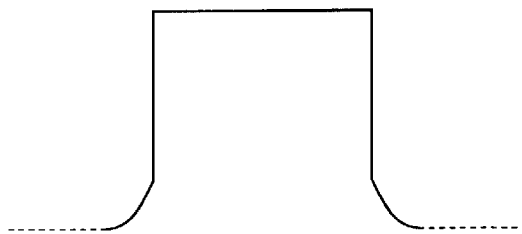
Figure 18D:
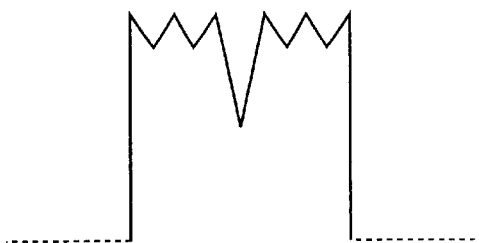
Figure 18E:
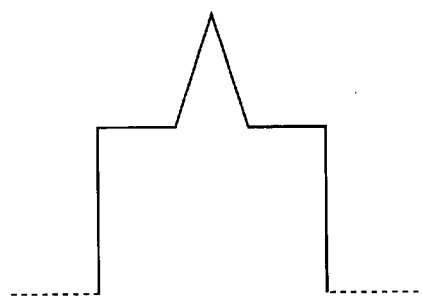
Figure 19A:
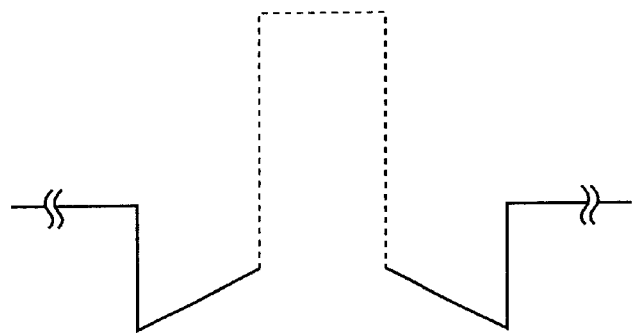
FIGS. 19A to 19D are views schematically showing respective form patterns applicable to the refractive index profile of the cladding region.
Figure 19B:
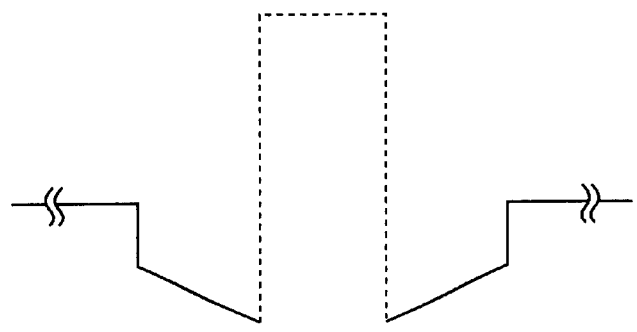
Figure 19C:
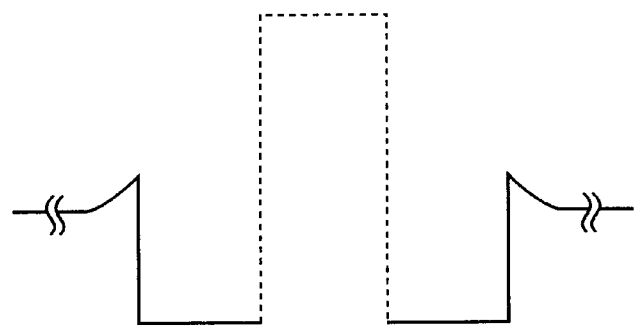
Figure 19D:
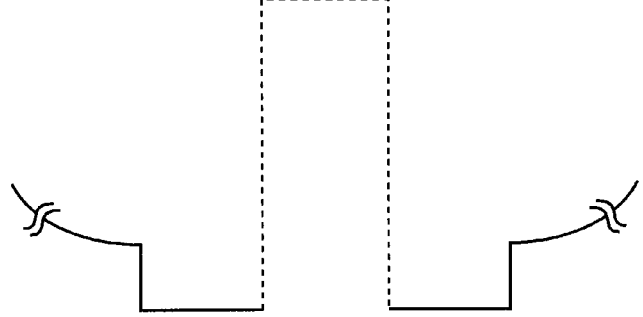

Without being restricted to the above-mentioned forms, the refractive index profile form of the optical fiber in accordance with the present invention can be changed in various ways. For example, as the refractive index profile form of the core region, one in which the refractive index is maximized at locations separated from the core region center by a predetermined distance as shown in FIG. 18A, one in which the refractive index is maximized at the boundary between the core region and cladding region as shown in FIG. 18B, one in which the refractive index gradually decreases at the boundary between the core region and cladding region as shown in FIG. 18C, one in which the refractive index is lowered in the vicinity of the center part of the core region as shown in FIG. 18D, and one in which the refractive index is raised in the vicinity of the center part of the core region as shown in FIG. 18E, and the like are applicable. As the refractive index profile form of the cladding region, on the other hand, one in which the refractive index of the inner cladding decreases from the center of the optical fiber toward the periphery thereof as shown in FIG. 19A, one in which the refractive index of the inner cladding increases from the center of the optical fiber toward the periphery as shown in FIG. 19B, one in which the refractive index of the outer cladding decreases in the vicinity of its boundary with the inner cladding along the radial direction of the optical fiber as shown in FIG. 19C, one in which the refractive index of the outer cladding increases from the center of the optical fiber toward the periphery thereof as shown in FIG. 19D, and the like are applicable.

The optical fibers in accordance with the present invention, those comprising a core region constituted by pure silica glass and having a structure in which the amount of fluorine added to a cladding region is adjusted so as to generate a desirable refractive index difference between the core region and cladding region in particular, are suitable for short-wavelength optical communications utilizing optical signals in the wavelength band of 1.35 to 1.52 μm. The reason thereof will be explained in the following.

The transmission loss of optical fibers is caused by Rayleigh scattering, UV absorption, IR absorption, absorption and scattering resulting from impurities, and the like in general. Also, dominant in the wavelength band of 1.0 to 1.6 μm is the loss resulting from the Rayleigh scattering represented by $$\alpha = \frac{A}{\lambda^4}$$

where A is the Rayleigh scattering coefficient, and λ is the wavelength; and OH group which is an impurity.

The Rayleigh scattering coefficient varies depending on the material added to silica glass and its concentration. In particular, it has been empirically known that, if $GeO_2$ is added by Δ%, then the Rayleigh scattering coefficient A is represented by $$A = A_{SiO2} \cdot (1 + \alpha_{GeO2} \cdot |\Delta|), \tag{6}$$

and that, if fluorine is added by Δ%, then the Rayleigh scattering coefficient A is represented by $$A = A_{SiO2} \cdot (1 + \alpha_F \cdot |\Delta|). \tag{7}$$

Here, $A_{SiO2}$ is the Rayleigh scattering coefficient of pure silica glass ($SiO_2$), whereas $a_{GeO2}$ and $a_F$ are constants. From these expressions (6) and (7), it can be seen that the Rayleigh scattering coefficient becomes greater as the concentration of $GeO_2$ or fluorine increases.

The Rayleigh scattering coefficient in the optical fiber is experimentally represented by $$A = \frac{\int A(r)P(r)rdr}{\int P(r)rdr} \tag{8}$$

upon superimposing the Rayleigh scattering coefficient A(r) and optical power distribution P(r) on each other at a location radially separated from the center by a distance r.

The above-mentioned expression (8) explains that, in the case where most of optical power is confined in a core region, optical fibers in which the core region is made of pure silica glass ($SiO_2$) lower transmission loss more than optical fibers whose core region is doped with $GeO_2$ do.

In general, in the case of optical fibers whose core region is made of pure silica glass, their cladding region is doped with fluorine, so as to attain a desirable refractive index difference. Since the Rayleigh scattering coefficient also becomes greater if the amount of addition of fluorine increases, however, it is preferred that the amount of addition of fluorine be as small as possible. By contrast, the smaller is the ratio of light seeping into the cladding region (the greater is the difference in refractive index between the core region and cladding region), the smaller becomes the Rayleigh scattering coefficient, and the lower becomes the transmission loss. The optical fiber in accordance with the present invention confines light into the core region more strongly than optical fibers such as those in conformity to G654 standard of ITU-T, thereby being able to lower the Rayleigh scattering.

As mentioned above, the transmission loss resulting from the Rayleigh scattering is proportional to the fourth power of $\lambda$, whereby the difference in Rayleigh scattering coefficient becomes more remarkable as the wavelength is shorter. This fact also indicates that the optical fibers in accordance with the present invention are suitable for short-wavelength optical communications utilizing optical signals in the wavelength band of 1.35 to 1.52 $\mu$m.

Figure 20:
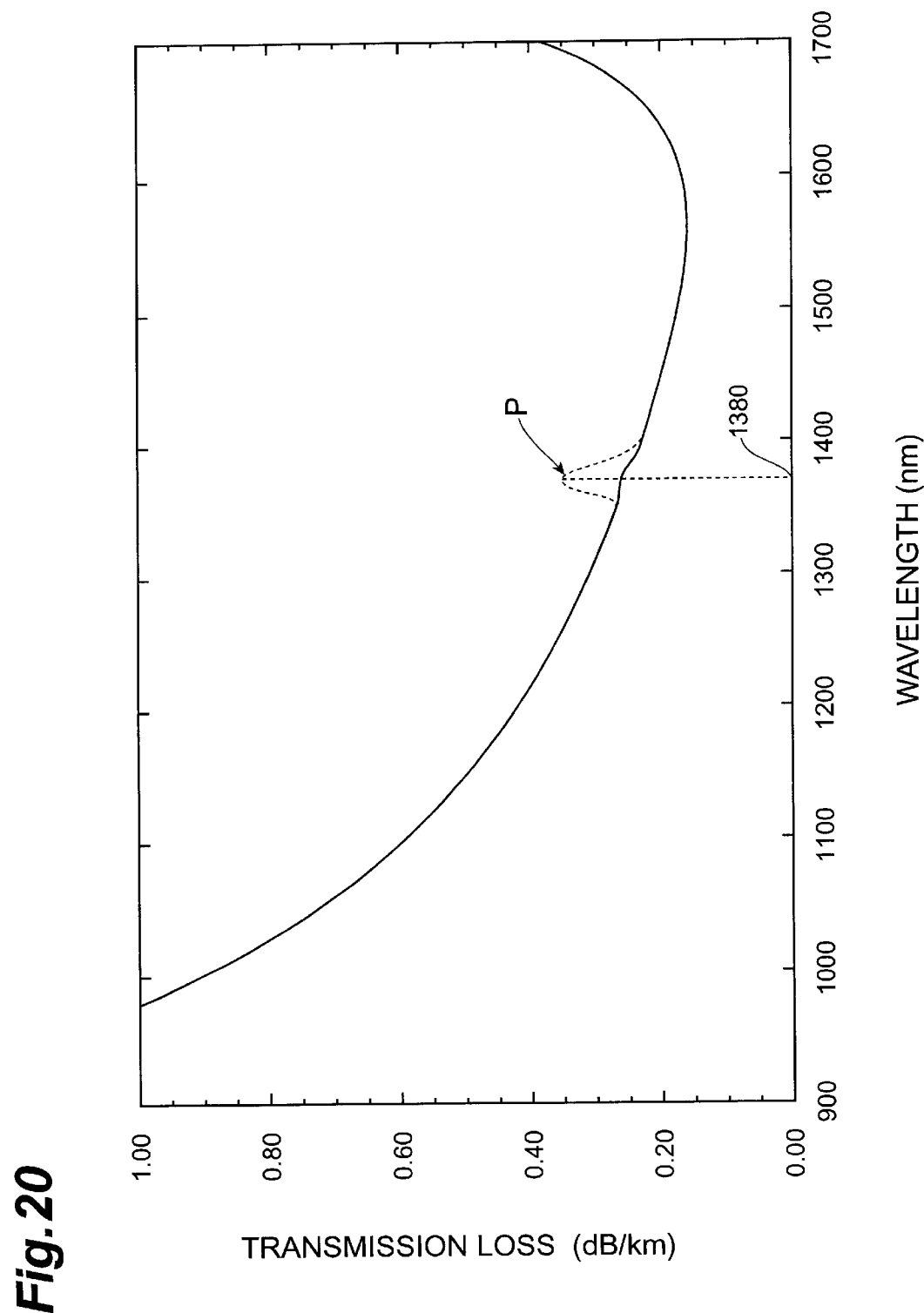
FIG. 20 is a graph showing a relationship between wavelength (nm) and transmission loss (dB/km)

The transmission loss caused by OH group has a loss peak at a wavelength of 1.38 $\mu$m as shown in FIG. 20, thereby becoming a cause for restricting optical communications in the short wavelength band of 1.35 to 1.52 $\mu$m as mentioned above. However, if dehydration processing or the like is carried out in a step of making an optical fiber or the like, so as to suppress the transmission loss at a wavelength of 1.38 $\mu$m to 0.3 dB/km or less, then optical communication systems suitable for optical communications in shorter wavelength bands can be constructed.

On the other hand, it has been known that the easiness of nonlinear optical phenomena to occur in an optical fiber is represented by $<N2>/A_{eff}$, and that nonlinear optical phenomena become less likely to occur as this value is smaller. Namely, while nonlinear optical phenomena are more likely to occur as the light incident on the optical fiber has a higher optical power, the above-mentioned relational expression indicates it preferable for the nonlinear refractive index $<N2>$ to be smaller and the effective area $A_{eff}$ to be greater in order to suppress the occurrence of nonlinear optical phenomena.

Here, the refractive index $<N>$ of a medium under strong light varies depending on the light intensity as mentioned above. Therefore, the lowest-order effect with respect to this refractive index $<N>$ is represented by:

$$<N> = <N0> + <N2> \cdot |E|^2$$

where $<N>$ is the refractive index with respect to linear polarization;

$<N2>$ is the second-order nonlinear refractive index with respect to the third-order nonlinear polarization; and $|E|^2$ is the light intensity.

Namely, under strong light, the refractive index $<N>$ of medium is given by the sum of the normal value $<N0>$ and an increase which is proportional to the square of photoelectric field amplitude E. In particular, the constant of proportion $<N2>$ (unit: $m^2/W$) in the second term is known as second-order nonlinear refractive index. Also, since the distortion of signal light pulses is mainly influenced by the second-order nonlinear refractive index in nonlinear refractive indices, the nonlinear refractive index in this specification mainly refers to the second-order nonlinear refractive index.

Thus, the optical fiber in accordance with the present invention comprises a structure in which nonlinear optical phenomena are hard to occur, thereby being suitable for optical transmission lines for long-distance optical communications such as submarine cable.

An optical communication system in which an optical fiber 30 is constituted by an optical fiber in accordance with the present invention and a dispersion-compensating optical fiber (hereinafter referred to as DCF) as shown in FIG. 1B will now be explained.

Since the optical fiber in accordance with the present invention has an effective area of at least 110 $\mu m^2$ at a wavelength of 1.55 $\mu$m, nonlinear optical phenomena are hard to occur therein. The nonlinear refractive index $<N2>$ is small when the core region is constituted by pure silica glass ($SiO_2$) alone or silica glass doped with chlorine, though it increases as the $GeO_2$ concentration rises. Therefore, the optical fiber in accordance with the present invention is characterized in that $<N2>/A_{eff}$ is so small that nonlinear optical phenomena are hard to occur even when the optical fiber is utilized in an area where the optical power is relatively high, such as the vicinity of a light source for optical signals or the exit end of an optical amplifier.

By contrast, the DSF has a high nonlinear refractive index $<N2>$ since its effective area $A_{eff}$ is 10 to 30 $\mu m^2$, which is small, and its core region is doped with a large amount of $GeO_2$ in order to compensate for dispersion. Therefore, the DCF is characterized in that nonlinear optical phenomena are likely to occur when utilized in an area where the optical power is high.

In view of the foregoing, if the optical fiber is disposed in an area where the optical power is high, such as the vicinity of a light source for optical signals or the vicinity of the exit end of an optical amplifier, whereas a DCF is disposed on the downstream side of the optical fiber where the optical power is lowered, so as to construct an optical communication system, then the occurrence of nonlinear optical phenomena is effectively suppressed, and a favorable transmission quality can be assured.

Further, an optical communication system in which the optical fiber 30 is constituted by the optical fiber in accordance with the present invention and a dispersion-shifted optical fiber (an optical fiber whose dispersion at a wavelength of 1.55 $\mu$m is 0 to $-6$ ps/nm/km, which is hereinafter referred to as NZ-DSP) as shown in FIG. 1B will now be explained.

There are cases where an NZ-DSF having a negative dispersion with a small absolute value is utilized as an optical transmission line for long-distance optical communications in order to prevent the quality of optical signals from deteriorating due to unstableness in modulation. In an optical communication system employing such an optical fiber, it is necessary that the dispersion accumulated as optical signals propagate over a long distance be compensated for by an optical fiber having a positive dispersion in the 1.55-$\mu$m wavelength band. The configuration in which the optical fiber in accordance with the present invention is disposed in the vicinity of the output end of an optical amplifier having a high optical signal power is effective in such an optical communication system as well.

The NZ-DSF has a small effective area $A_{eff}$ of 50 to 80 $\mu m^2$. Also, the efficiency of occurrence of four-wave mixing η is approximated by the following expression:

$$\eta = \left(\frac{\langle N2 \rangle}{A_{eff}} \cdot \frac{\alpha}{Disp}\right)^2$$

where α is transmission loss, and Disp is chromatic dispersion.

Thus, if the absolute value of dispersion is small, then the efficiency of occurrence of four-wave mixing becomes greater in the NZ-DSF in which the dispersion is 0 to −6 ps/nm/km, which is small, whereby there is a possibility of optical signals deteriorating their quality when the NZ-DSF is disposed at an area where the optical power is high.

The microbend loss of the optical fiber in accordance with the present invention will now be explained. It has been knownthat, in general, microbend loss (dB/km) increases as the effective area $A_{eff}$ is greater. Therefore, in the optical fiber in accordance with this embodiment, it is important that the increase in microbend loss be suppressed so as to fall within a permissible range while enhancing the effective area. For example, when an optical fiber is employed in an optical fiber unit or an optical fiber cable including this optical fiber unit having a cross-sectional structure shown in FIG. 21A or FIG. 21B, it is preferred that the microbend loss of the applied optical fiber be suppressed to about 1 dB/km or less in order to prevent transmission characteristics from deteriorating due to cabling.

Figure 21A:
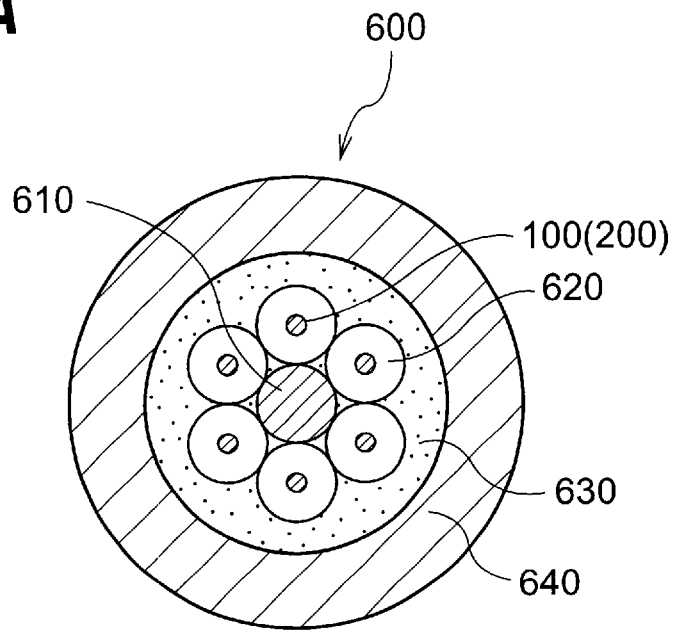
FIGS. 21A and 21B are views showing cross-sectional structures of an optical fiber unit to which the optical fiber in accordance with the present invention is applicable and a cable including the same, respectively.
Figure 21B:
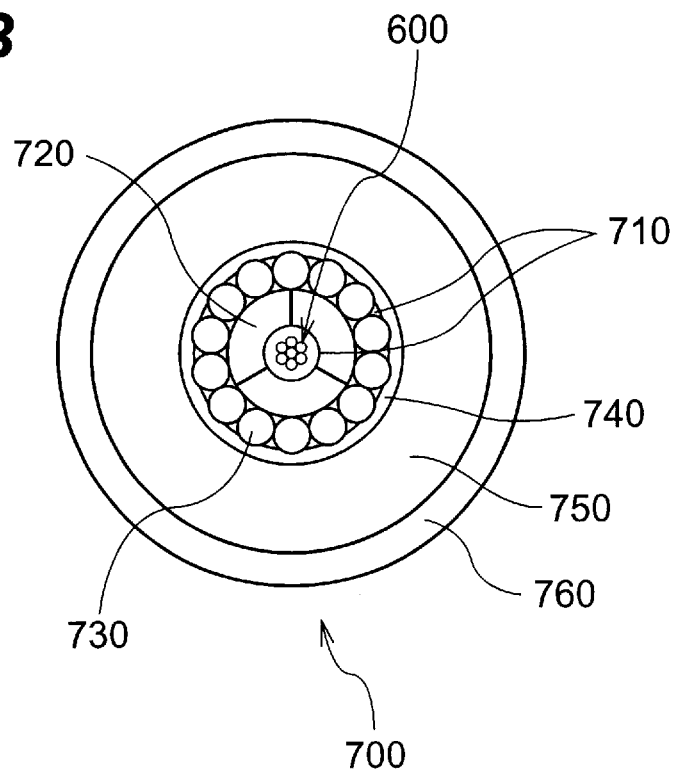

The optical fiber unit 300 shown in FIG. 21A comprises a structure in which optical fibers 100 (200), each coated with a UV-curable resin 620, are disposed around a tension member 61 and are successively coated with UV-curable resin layers 630 and 640. In an optical fiber cable 700 employing the optical fiber unit 600 comprising the foregoing structure, as shown in FIG. 21B, a plurality of optical fiber units 600 are coated with a waterproof compound 710, whereas tension members 730 are disposed around the waterproof compound 710 by way of a three-part iron pipe 720. While the optical fiber units 600 thus covered with the tension members 730 are accommodated within a copper tube 740, the interstices between the tension members 730 are filled with the waterproof compound 730. Further, the copper tube 740 is successively covered with a low-density polyethylene layer 750 and a high-density polyethylene layer 760.

As mentioned above, the microbend loss is the amount of increase in loss at a wavelength of 1.55 $\mu m$ occurring when an optical fiber is wound about a bobbin having a barrel diameter of 280 mm whose surface is wound with JIS#1000 sandpaper. The microbend loss varies depending on the resin layers surrounding the optical fiber and the fiber diameter of optical fiber. In the following, the relationship between the resin layers surrounding the optical fiber and the microbend loss, and the relationship between the fiber diameter of optical fiber and the microbend loss will be explained.

FIG. 22 is a cross-sectional view of an optical fiber coated with a resin layer. As shown in this drawing, an optical fiber 100 (200) having a fiber diameter of 125 $\mu m$ is successively surrounded by a first resin layer 300 having a Young's modulus E1 and an outside diameter d1, and a second resin layer 400 having a Young's modulus E2 and an outside diameter d2. Here, Young's moduli E1, E2 are given by the ratio T/ε of the stress T applied to the respective axial directions of the first and second resin layers 300, 400 to the amount of distortion ε yielded upon the application of stress T. The microbend loss was measured while the respective outside diameters and Young's moduli of the first and second resin layers 300, 400 are changed variously. The results are shown in FIGS. 23 to 27.

FIG. 23 is a table showing microbend loss (dB/km) and the like obtained when the Young's modulus E1 of first resin layer 300 was changed. The samples prepared for measurement are set such that the outside diameter d1 of first resin layer 300 is about 200 $\mu m$, the Young's modulus E2 of second resin layer 400 is about 70 kg/mm², and the outside diameter d2 of second resin layer 400 is about 250 $\mu m$. In these measurement samples, the microbend loss was 0.50 dB/km, 1.0 dB/km, and 1.5 dB/km when the Young's modulus E1 of first resin layer 300 was 0.06 kg/mm², 0.12 kg/mm², and 0.20 kg/mm², respectively.

FIG. 24 is a table showing microbend loss (dB/km) and the like obtained when the outside diameter d1 of first resin layer 300 was changed. The samples prepared for measurement are set such that the Young's modulus E1 of first resin layer 300 is about 0.12 kg/mm², the Young's modulus E2 of second resin layer 400 is about 70 kg/mm², and the outside diameter d2 of second resin layer 400 is about 250 $\mu m$. In these measurement samples, the microbend loss was 1.8 dB/km, 0.85 dB/km, and 0.38 dB/km when the outside diameter d1 of first resin layer 300 was about 180 $\mu m$, about 200 $\mu m$, and about 209 $\mu m$, respectively.

FIG. 25 is a table showing microbend loss (dB/km) and the like obtained when the Young's modulus E2 of second resin layer 400 was changed. The samples prepared for measurement are set such that the Young's modulus E1 of first resin layer 300 is about 0.12 kg/mm², the outside diameter d1 of first resin layer 300 is about 200 $\mu m$, and the outside diameter d2 of second resin layer 400 is about 250 $\mu m$. In these measurement samples, the microbend loss was 0.12 dB/km, 0.31 dB/km, 0.72 dB/km, 1.2 dB/km, and 1.4 dB/km when the Young's modulus E2 of second resin layer 400 was about 0.2 kg/mm², about 1 kg/mm², about 10 kg/mm², about 70 kg/mm², and about 100 kg/mm², respectively.

FIG. 26 is a table showing microbend loss (dB/km) and the like obtained when the Young's modulus E2 of second resin layer 400 was changed. The samples prepared for measurement are set such that the Young's modulus E1 of first resin layer 300 is about 0.12 kg/mm², the outside diameter d1 of first resin layer 300 is about 290 $\mu m$, and the outside diameter d2 of second resin layer 400 is about 400 $\mu m$. In these measurement samples, the microbend loss was 0.45 dB/km, 0.96 dB/km, 2.3 dB/km, 4.1 dB/km, and 4.5 dB/km when the Young's modulus E2 of second resin layer 400 was about 0.2 kg/mm², about 1 kg/mm², about 10 kg/mm², about 70 kg/mm², and about 100 kg/mm², respectively.

FIG. 27 is a table showing microbend loss (dB/km) and the like obtained when the outside diameter d2 of second resin layer 400 was changed. The samples prepared for measurement are set such that the Young's modulus E1 of first resin layer 300 is about 0.12 kg/mm², the outside diameter d1 of first resin layer 300 is about 200 $\mu m$, and the Young's modulus E2 of second resin layer 400 is about 70 kg/mm². In these measurement samples, the microbend loss was 8.2 dB/km, 1.5 dB/km, 0.95 dB/km, and 0.65 dB/km when the outside diameter d2 of second resin layer 400 was about 250 $\mu m$, about 350 $\mu m$, about 400 $\mu m$, and about 450 $\mu m$, respectively.

As can be seen from the results shown in the foregoing FIGS. 23 to 27, themicrobend loss becomes lower as the Young's modulus E1 of first resin layer 300 is smaller, the outside diameter d1 of first resin layer 300 is greater, the Young's modulus E2 of second resin layer 400 is smaller, or the outside diameter d2 of second resin layer 400 is greater, whereby transmission characteristics of the optical fiber improve. Therefore, coating the optical fibers 100, 200 in accordance with the above-mentioned first and second embodiments with a resin layer having a small Young's modulus and a large outside diameter yields a cable having a low microbend loss even when its effective area is large.

Figure 29:
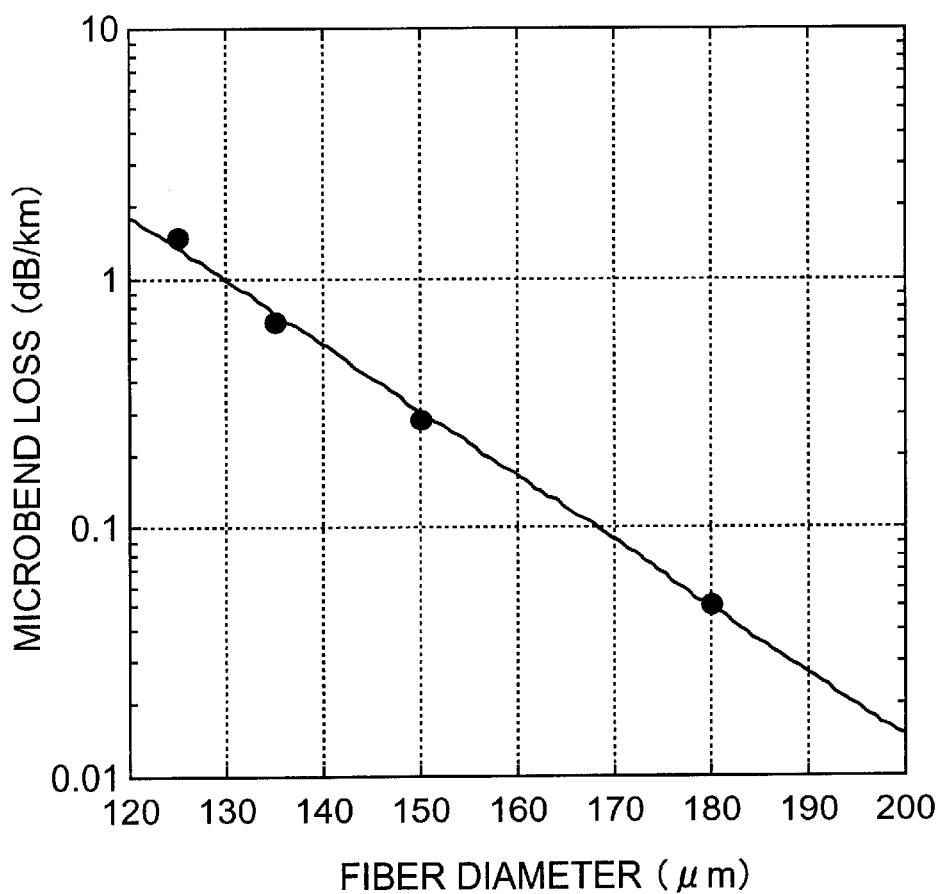
FIG. 29 is a graph showing a relationship between fiber diameter ($\mu$m) and microbend loss (dB/km).

FIG. 28 is a table showing microbend loss (dB/km) and the like obtained when the fiber diameter of an optical fiber was changed, whereas FIG. 29 is a graph showing a relationship between fiber diameter and microbend loss. The measurement samples prepared for obtaining the table of FIG. 28 are set such that the effective area is about 150 $\mu m^2$, the cutoff wavelength at 2 m is about 1.34 $\mu m$, the dispersion at a wavelength of 1.55 $\mu m$ is about 21 ps/nm/km, and the dispersion slope is about 0.060 ps/nm$^2$/km. In these measurement samples, the microbend loss was 1.5 dB/km, 0.70 dB/km, 0.28 dB/km, and 0.05 dB/km when the fiber diameter was 125 $\mu m$, 135 $\mu m$, 150 $\mu m$, and 180 $\mu m$, respectively.

From FIGS. 28 and 29, it can be seen that the microbend loss decreases as the fiber diameter of optical fiber is greater. In the case of an optical fiber having an effective area of about 150 $\mu m^2$, the fiber diameter is required to be at least 130 $\mu m$ in order for the microbend loss to become 1 dB/km or less. On the other hand, as the fiber diameter of optical fiber is greater, a larger distortion occurs in the cladding surface, thereby enhancing the probability of breakage. If the fiber diameter is 200 $\mu m$ or less, then the probability of breakage becomes $10^{-5}$ or less, which is unproblematic in practice. Therefore, while optical fibers have a fiber diameter of 125 $\mu m$ in general, if the fiber diameter (outside diameter of the outer-layer cladding region) is set to 130 $\mu m$ to 200 $\mu m$ as in the optical fibers in accordance with the above-mentioned first and second embodiments, then the microbend loss can be lowered even when the effective area is large, and the probability of breakage can be reduced.

Without being restricted to the structures of the above-mentioned embodiments, the present invention can be modified in various manners. Also, specific samples corresponding to the optical fiber in accordance with the present invention are not limited by the structures of the above-mentioned samples.

As in the foregoing, the optical fiber in accordance with the present invention, either with a matched type or depressed cladding type refractive index profile, is characterized in that it has, as characteristics at a wavelength of 1.55 $\mu m$, an effective area of at least 110 $\mu m^2$, preferably at least 120 $\mu m^2$, more preferably at least 150 $\mu m^2$, a dispersion of 18 to 23 ps/nm/km, and a dispersion slope of 0.058 to 0.066 ps/nm$^2$/km. Thus, the optical fiber has a large effective area at a wavelength of 1.55 $\mu m$, so that the occurrence of nonlinear optical phenomena is effectively suppressed even when optical signals (in the 1.55-$\mu m$ wavelength band) having a high power are transmitted therethrough, thus being suitable for optical transmission lines such as submarine cable in long-distance optical communications.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber comprising a core region extending along a predetermined axis and an outside diameter 2a, and a cladding region disposed at an outer periphery of said core region; said optical fiber having, as characteristics at a wavelength of 1.55 $\mu m$,
   an effective area of at least 110 $\mu m^2$,
   a dispersion of 18 to 23 ps/nm/km, and
   a dispersion slope of 0.058 to 0.066 ps/nm$^2$/km.

2. An optical fiber according to claim 1, wherein said cladding region comprises an inner cladding disposed at the outer periphery of said core region; and an outer cladding, disposed at an outer periphery of said inner cladding, having a refractive index higher than that of said inner cladding.

3. An optical fiber according to claim 2, wherein the ratio 2b/2a of the outside diameter 2b of said inner cladding to the outside diameter 2a of said core region is 1.1 to 7.

4. An optical fiber according to claim 2, wherein said core region has a relative refractive index difference of +0.15% to +0.50% with respect to said outer cladding, and wherein said inner cladding has a relative refractive index difference of −0.15% to −0.01% with respect to said outer cladding.

5. An optical fiber according to claim 1, wherein said core region has a relative refractive index difference of +0.15% to +0.30% with respect to said cladding region.

6. An optical fiber according to claim 1, wherein said optical fiber has a transmission loss of 0.30 dB/km or less at a wavelength of 1.38 $\mu m$.

7. An optical fiber according to claim 1, wherein said optical fiber has an effective area of at least 120 $\mu m^2$ at a wavelength of 1.55 $\mu m$.

8. An optical fiber according to claim 1, wherein said optical fiber has an effective area of at least 150 $\mu m^2$ at a wavelength of 1.55 $\mu m$.

9. An optical fiber according to claim 1, wherein said optical fiber has a cutoff wavelength of 1.3 $\mu m$ to 1.75 $\mu m$ at a fiber length of 2 m.

10. An optical fiber according to claim 1, wherein said optical fiber has a transmission loss of 0.180 dB/km or less at a wavelength of 1.55 $\mu m$.

11. An optical fiber according to claim 1, wherein said core region has an outside diameter of 11.5 $\mu m$ to 23.0 $\mu m$.

12. An optical fiber according to claim 1, wherein said cladding region has an outside diameter of 130 $\mu m$ to 200 $\mu m$.

13. An optical fiber according to claim 1, wherein said core region comprises silica glass essentially comprising of $SiO_2$, and wherein said cladding region comprises silica glass doped with fluorine.

14. An optical fiber according to claim 1, wherein said core region comprises silica glass doped with chlorine, and wherein said cladding region comprises silica glass doped with fluorine.

15. An optical fiber according to claim 1, wherein, in a cross section of said core region orthogonal to said predetermined axis, said core region has a refractive index changing from a center part of said core region toward an outer peripheral part thereof.

16. An optical fiber according to claim 15, wherein, in the cross section of said core region orthogonal to said predetermined axis, the refractive index difference $\Delta n_\alpha(r)$ at a location radially separated by a distance r ($0 \leq r \leq a$) from the center part of said core region with respect to a reference region of said cladding region is approximated by the following expression:

$$\Delta n_\alpha(r) = \Delta n_\alpha(0) \cdot |1-(r/a)^\alpha|$$

where
   $\Delta n_\alpha(0)$ is the relative refractive index difference of the center part of said core region with respect to the reference region of said cladding region; and
   $\alpha$ is 1 to 10.

17. An optical fiber according to claim 15, wherein, in the cross section of said core region orthogonal to said predetermined axis, the refractive index difference $\Delta n_a(r)$ at a location radially separated by a distance r ($0 \leq r \leq a$) from the center part of said core region with respect to a reference region of said cladding region is approximated by the following expression:

$$\Delta n_\alpha(r) = \Delta_\alpha(\alpha) \cdot |1-\gamma \cdot (1-r/\alpha)^\beta|$$

where $\Delta n_a(a)$ is the relative refractive index difference at a location corresponding to the outer periphery of said core region with respect to the reference region of said cladding region;

$\beta$ is 1 to 10; and $\gamma$ is a positive real number.

18. An optical communication system for propagating an optical signal in a wavelength band of 1.35 to 1.52 μm, said optical communication system comprising the optical fiber according to claim 1.

19. An optical communication system comprising:

an optical amplifier for amplifying an optical signal having wavelengths different from each other; and the optical fiber according to claim 1 disposed at a position where said optical signal emitted from said optical amplifier arrives.

20. An optical communication system according to claim 19, wherein said optical amplifier includes an erbium-doped amplification optical fiber comprising an amplification optical fiber doped with erbium.

21. An optical communication system according to claim 19, wherein said optical amplifier includes a Raman amplifier.

22. An optical fiber comprising:

a core region extending along a predetermined axis and having an outside diameter 2a; and a cladding region comprising an inner cladding, disposed at an outer periphery of said core region, having a refractive index lower than that of said core region; and an outer cladding, disposed at an outer periphery of said inner cladding, having a refractive index higher than that of said inner cladding;

said optical fiber having, as characteristics at a wavelength of 1.55 μm:

an effective area of 110 μm$^2$ or more;

a dispersion of 18 to 23 ps/nm/km; and a dispersion slope of 0.058 to 0.066 ps/nm$^2$/km.

* * * * *